US012690956B2

(12) United States Patent
Bushman

(10) Patent No.: US 12,690,956 B2
(45) Date of Patent: Jul. 28, 2026

(54) DENTAL FLOSSER WITH FLOSS TENSIONER

(71) Applicant: Richard P. Bushman, Stillwater, MN (US)

(72) Inventor: Richard P. Bushman, Stillwater, MN (US)

( * ) Notice: Subject to any disclaimer, the term of this patent is extended or adjusted under 35 U.S.C. 154(b) by 467 days.

(21) Appl. No.: 18/313,507

(22) Filed: May 8, 2023

(65) Prior Publication Data
US 2023/0270531 A1 Aug. 31, 2023

Related U.S. Application Data

(63) Continuation-in-part of application No. 17/184,416, filed on Feb. 24, 2021, now Pat. No. 11,779,441.

(60) Provisional application No. 63/364,356, filed on May 9, 2022, provisional application No. 62/980,561, filed on Feb. 24, 2020.

(51) Int. Cl.
*A61C 15/04* (2006.01)

(52) U.S. Cl.
CPC .......... *A61C 15/046* (2013.01); *A61C 15/043* (2013.01)

(58) Field of Classification Search
CPC ............................ A61C 15/046; A61C 15/043
See application file for complete search history.

(56) References Cited

U.S. PATENT DOCUMENTS

| | | | | |
|---|---|---|---|---|
| 1,640,607 A | * | 8/1927 | Kitley .................. | A61C 15/046 |
| | | | | 132/325 |
| 3,734,107 A | | 5/1973 | Thierman | |

| | | | | |
|---|---|---|---|---|
| 3,746,017 A | * | 7/1973 | Casselman ........... | A61C 15/046 |
| | | | | 132/325 |
| 3,759,274 A | | 9/1973 | Warner | |
| 3,927,687 A | * | 12/1975 | Thierman .............. | B65H 75/28 |
| | | | | 242/588.6 |
| 5,269,331 A | | 12/1993 | Tanriverdi | |
| 7,082,950 B2 | * | 8/2006 | Kossak ................ | A61C 15/046 |
| | | | | 132/325 |
| 7,156,110 B2 | | 1/2007 | Landry | |
| 8,671,958 B2 | | 3/2014 | Borg et al. | |

(Continued)

FOREIGN PATENT DOCUMENTS

| | | |
|---|---|---|
| WO | WO 2002/094118 | 11/2002 |
| WO | WO 2004/084760 | 10/2004 |

OTHER PUBLICATIONS

Examiner's Requisition from related CA Pat. App. 3,172,039, Canadian Intellectual Property Office, Oct. 19, 2023 (4 pp.).

(Continued)

*Primary Examiner* — Rachel R Steitz
(74) *Attorney, Agent, or Firm* — FisherBroyles, LLP

(57) ABSTRACT

A dental flosser includes a handle, a floss support coupled to the handle, a floss dispensing spool coupled to the handle, a floss collecting spool coupled to the handle, a thumbwheel coupled to the handle, and a spool brake coupled to the handle. The spool brake is configured to move between a first position where the spool brake prevents rotation of the floss dispensing spool and/or the floss collecting spool and a second position where the spool brake allows rotation of the floss dispensing spool and/or the floss collecting spool. The spool brake includes a release arm accessible from an exterior of the dental flosser and configured to move the spool brake between the first position and the second position.

23 Claims, 20 Drawing Sheets

(56) References Cited

U.S. PATENT DOCUMENTS

| | | | |
|---|---|---|---|
| 2002/0078974 | A1 | 6/2002 | Kossak et al. |
| 2003/0106565 | A1* | 6/2003 | Andrews .............. A61C 15/046 132/325 |
| 2006/0011212 | A1 | 1/2006 | Achepohl et al. |
| 2006/0254610 | A1* | 11/2006 | Chen .................... A61C 15/046 132/325 |
| 2007/0204879 | A1 | 9/2007 | Chen et al. |
| 2011/0041870 | A1 | 2/2011 | Kalbfeld et al. |
| 2014/0166042 | A1 | 6/2014 | Aragon |
| 2019/0167398 | A1 | 6/2019 | Bixby |

OTHER PUBLICATIONS

How to Repair Your Floss Boss, The Floss Boss Channel YouTube channel, available at https://www.youtube.com/watch?v=r1QQGzBWLBw, the video is submitted as one or more pdf files containing screenshots taken at approximately 1 sec intervals, Jan. 20, 2015 (each page labeled "HTR" and consecutively numbered) (total 39 pp.).

How to Use the Floss Boss, The Floss Boss Channel YouTube channel, available at https://www.youtube.com/watch?v=VTjfY4JbQt0, the video is submitted as one or more pdf files containing screenshots taken at approximately 1 sec intervals, Jan. 20, 2015 (each page labeled "HTU" and consecutively numbered) (total 54 pp.).

International Search Report and Written Opinion from counterpart Int'l Pat. App. PCT/IB2023/054762, Jul. 24, 2023 (10 pp.).

Communication from European Patent Office in EP Pat. App. 21761817.2, which is a counterpart of parent U.S. Pat. No. 11,779,441, Apr. 3, 2025 (5 pp.).

International Search Report and Written Opinion from counterpart Int'l Pat. App. PCT/US2021/019476, Jun. 29, 2021 (19 pp.).

Information about Counterpart and/or Related Patents, Patent Applications, and Patent Office Proceedings see the section below having the same title.

Information Submitted in Parent Patent Applications, see MPEP 609.02 and the section below having the same title.

U.S. Appl. No. 17/184,416, 2021/0259816, filed Aug. 26, 2021, Dental Flosser with Floss Tensioner.

* cited by examiner

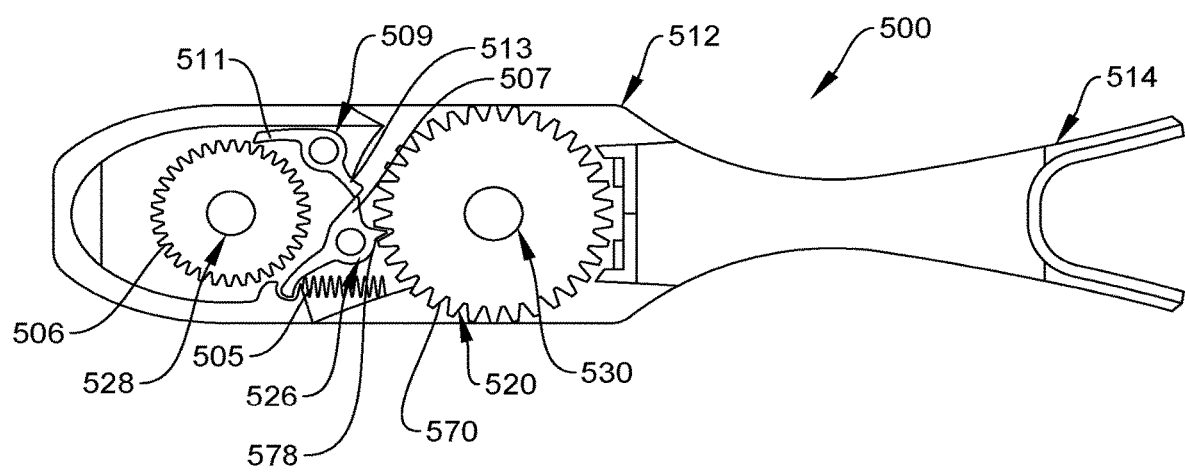
FIG. 9
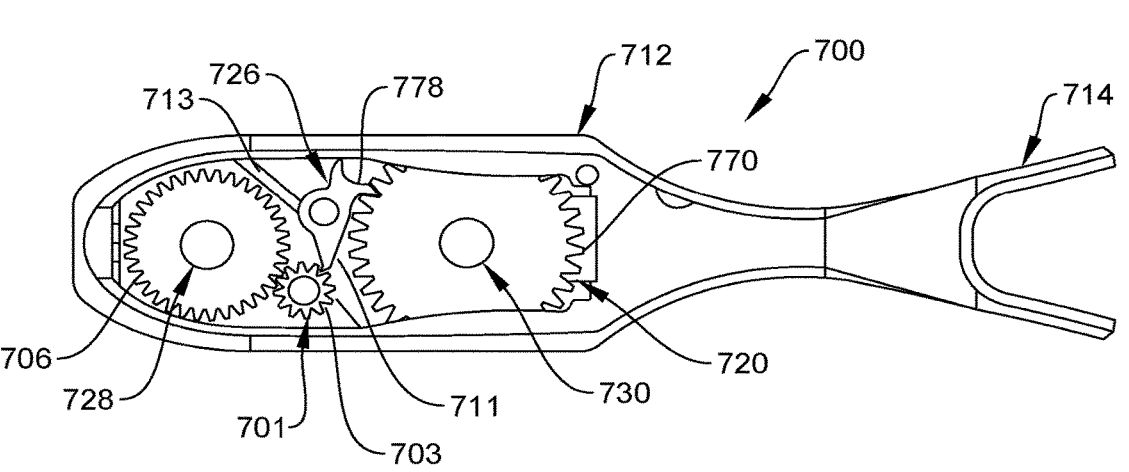
FIG. 10
FIG. 11

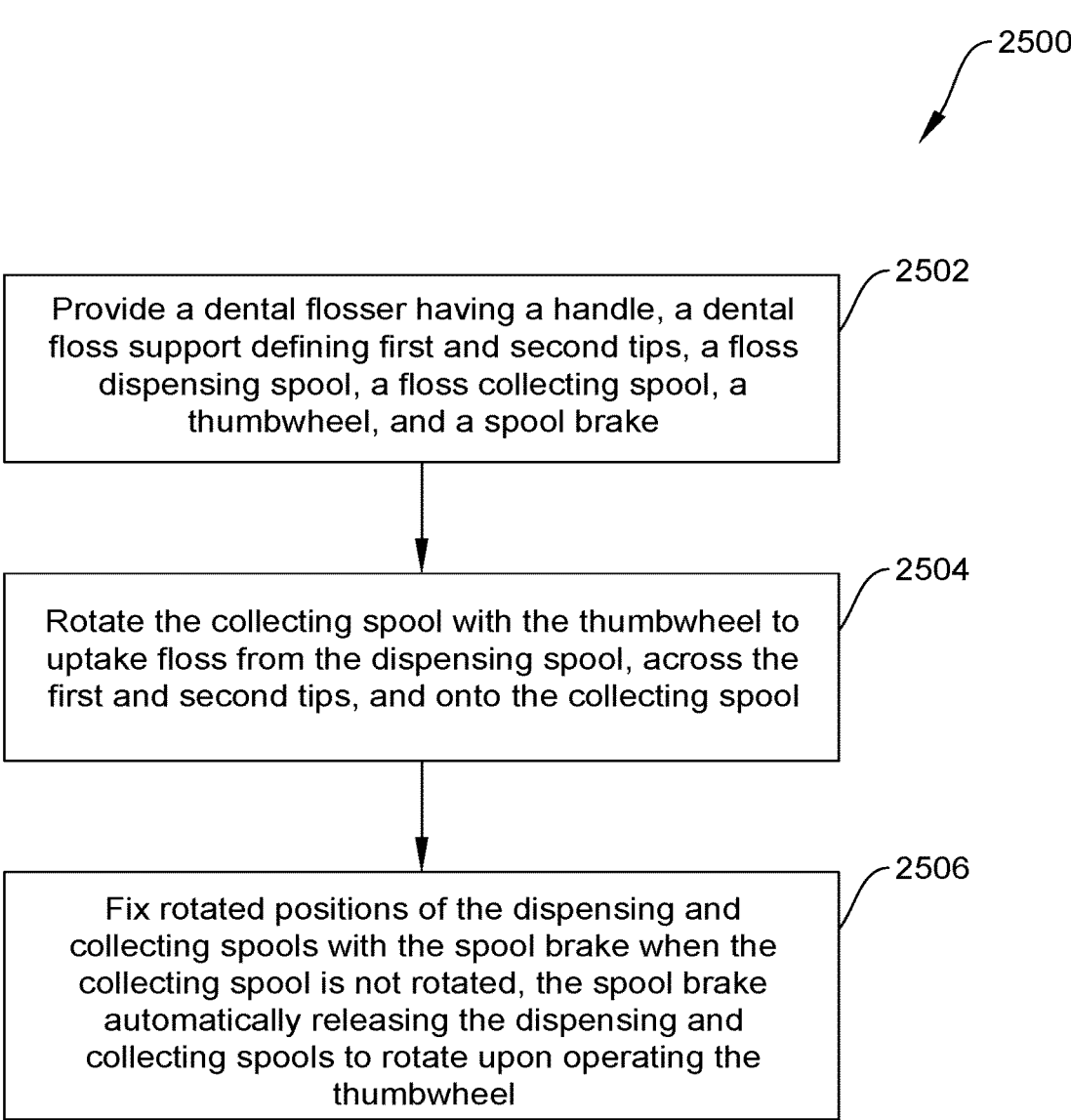

2500

2502

Provide a dental flosser having a handle, a dental floss support defining first and second tips, a floss dispensing spool, a floss collecting spool, a thumbwheel, and a spool brake

2504

Rotate the collecting spool with the thumbwheel to uptake floss from the dispensing spool, across the first and second tips, and onto the collecting spool

2506

Fix rotated positions of the dispensing and collecting spools with the spool brake when the collecting spool is not rotated, the spool brake automatically releasing the dispensing and collecting spools to rotate upon operating the thumbwheel

FIG. 29

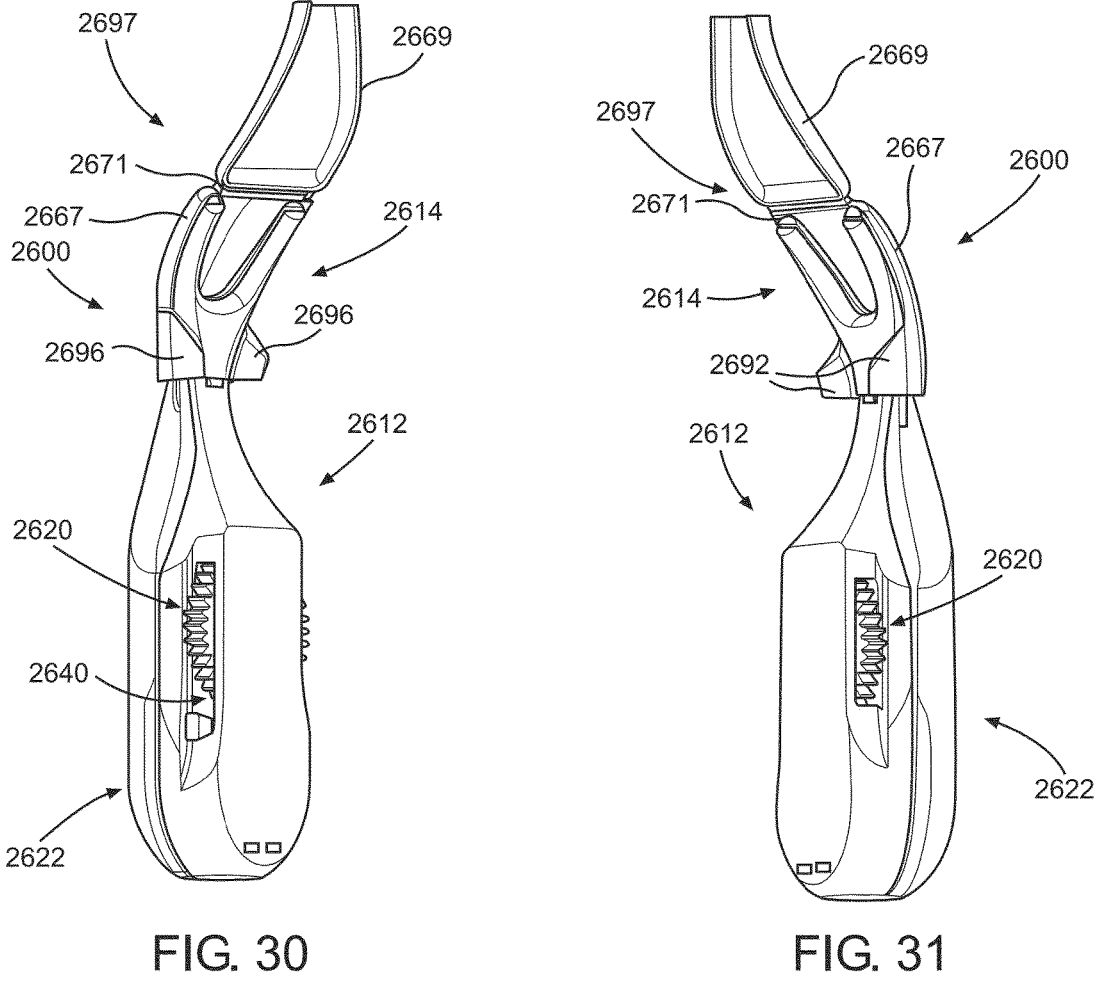
FIG. 30
FIG. 31
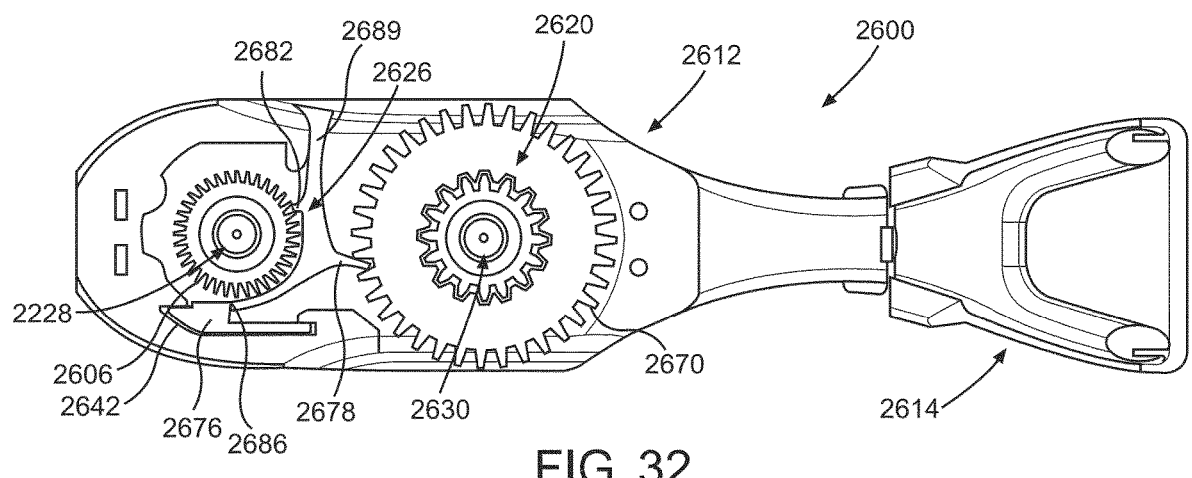
FIG. 32

DENTAL FLOSSER WITH FLOSS TENSIONER

TECHNICAL FIELD

This relates to dental flossing devices, and more particularly to dental flossers with floss tensioning and used floss take-up features, and related methods of manufacture and use of such dental flossers.

BACKGROUND

Tooth flossing is an important part of the regular maintenance of the health of teeth and gums. In its simplest form, floss is dispensed from a container, and each end of a piece of floss is wrapped around a finger on each of the user's two hands. The floss is brought into the mouth for use by the motion of both hands. This can be an awkward procedure under the best circumstances. It is particularly awkward for a person with limited mobility or in circumstances where a person is flossing the teeth of another person such as a dental technician or a person aiding a disabled person or child. Therefore, various attempts have been made to develop implements for simplifying the flossing procedure.

The flossing apparatuses generally have a divergent or fork-shaped head portion with two prongs for holding a piece of dental floss between them. This head portion replaces the fingers that are used in the manual flossing procedure and is the part of the apparatus which is brought into the mouth for doing the actual flossing. The floss must be taught between the two ends of the prongs to provide a stiff piece of floss for the user to work between their teeth.

The flossing apparatuses also generally have a handle portion which the user can grasp with one hand. While holding the handle, the user can move the forked floss holding end of the apparatus to a proper location for conducting the flossing. There may also be a neck connecting the fork shaped head portion with the handle portion. The neck may make for greater mobility of the apparatus when the fork shaped head portion is inserted in the oral cavity, especially for reaching rear teeth.

While the designs have differed significantly in the shape and orientation of the handle and a fork shaped head portion, an even greater variation exists in the treatment of the dental floss itself in the apparatus. For example, the dental floss can be fixedly attached to the head portion such that the entire head portion must be replaced to refresh the piece of dental floss in position for use. This arrangement is particularly unsatisfactory since the floss may have to be refreshed quite frequently which would make the necessary replacement of the entire head portion both inconvenient and unnecessarily expensive.

Therefore, several designs of flossing apparatuses have contained dispensing spools within the apparatus to supply a source of fresh floss for replenishing the portion of floss in position for use. These apparatuses have a means for cutting off the spent floss once fresh floss has been delivered across the head of the apparatus for use. A tying portion is provided for holding the floss rigidly against the tension produced when using the floss. These designs are not optimal because the spent portion of the floss must be handled by the user for advancing new floss in position for use and for removing the old floss. This is unpleasant when the user is flossing their own teeth, and unhygienic when the user is flossing the teeth of another person. Furthermore, the procedure is time consuming.

To address the problems associated with the disposal of used floss, several designs have incorporated a spool for the specific purpose of taking up the used dental floss. These designs have various degrees of complexity. Previous designs for dental flossing apparatuses have not provided a mechanism whereby the user can advance the dental floss easily with one hand with a minimum of effort while keeping the floss under sufficient tension to allow flossing, particular when using a light, manual apparatus that is relatively inexpensive (e.g., a disposable apparatus or one where the dispensing and collection spools are maintained in cartridges that can be replaced), and that can maintain the tension along the floss while the user is advancing the floss without any effort beyond advancing a knob.

For these and other reasons, there is a need to provide improved dental flossers.

GENERAL DESCRIPTION

The dental flosser and related methods of operating a dental flosser as disclosed herein provide a number of advantages related to management of the unused and used floss and maintaining tension in the floss during use.

One aspect of the present disclosure relates to a dental flosser having a handle, a dental floss support, a floss dispensing spool, a floss collecting spool, a thumbwheel, and a spool brake. The dental floss support is mounted to the handle and includes first and second projections, each projection defining a tip. The floss dispensing spool and floss collecting spool are mounted to the handle. The thumbwheel is operable to rotate the collecting spool to cause uptake of floss from the dispensing spool, across the tips of the first and second projections, and onto the collecting spool. The spool brake member is mounted to the handle and operable to fix rotated positions of the dispensing and collecting spools, and to automatically release the dispensing spool to rotate upon operating the thumbwheel.

The thumbwheel may project from the handle, and rotation of the thumbwheel may initiate rotation of the collecting spool. The thumbwheel may project from opposite sides of the handle. The dental flosser may also include a dispensing gear mounted to the housing coaxially with the dispensing spool, and a collecting gear mounted to the housing coaxially with the collecting spool, and the spool brake member may be operable to engage the dispensing and collecting gears to control rotation of the dispensing and collecting spools. The dispensing gear may include gear teeth with a different size than gear teeth of the collecting gear. The gear teeth of the dispensing collecting gear may be larger than the gear teeth of the collecting dispensing gear. The dispensing collecting gear may have a larger diameter than the diameter of the collecting dispensing gear. The thumbwheel may define the dispensing collecting gear.

The dental flosser may also include at least one floss tensioner positioned in the housing and operable to contact the floss to provide resistance to uptake dispensing of the floss. The dental flosser may also include a spool tensioner operable to apply a compression force on a rotation spindle of the collecting dispensing spool when the spool brake fixes rotated positions of the dispensing and collecting spools.

Another aspect of the present disclosure relates to a dental flosser that includes a handle, a dental floss support mounted to the handle and having first and second projections, each projection defining a tip, a floss dispensing spindle rotatably mounted to the handle, and a floss collecting spindle rotatably mounted to the handle. The dental flosser also includes a thumbwheel mounted to the collecting spindle to rotate the collecting spindle to cause uptake of floss from the dispensing spindle, across the tips of the first and second projections, and onto the collecting spindle. The thumbwheel has a plurality of gear teeth. The dental flosser further includes a dispensing gear mounted coaxially with the dispensing spindle, the dispensing gear having a plurality of gear teeth, and a brake member mounted to the handle and operable to engage the gear teeth of the thumbwheel and dispensing gear to fix rotated positions of the dispensing and collecting spindles, and to automatically release the dispensing spindle to rotate upon operating the thumbwheel.

The dispensing gear may be formed integral with the dispensing spindle. The dental flosser may also include a collecting gear mounted coaxially with the collecting spindle, and the thumbwheel is mounted to the collecting gear. The collecting gear may be formed integral with the collecting spindle. The brake member may include a first arm with arranged to engage the gear teeth of the thumbwheel, and a second arm arranged to engage the gear teeth of the dispensing gear.

A further aspect of the present disclosure relates to a method of operating a dental flosser. The method includes providing the dental flosser with a handle, a dental floss support defining first and second tips, a floss dispensing spool, a floss collecting spool, a thumbwheel, and a spool brake, rotating the collecting spool with the thumbwheel to uptake floss from the dispensing spool, across the first and second tips, and onto the collecting spool, and fixing rotated positions of the dispensing and collecting spools with the spool brake when the thumbwheel is stationary. The spool brake automatically releases the dispensing spool to rotate upon rotating the thumbwheel.

The spool brake may include first and second arms arranged to engage the collecting and dispensing spools, respectively, to fix the rotated positions. The thumbwheel may be arranged coaxially with the collecting spool, the thumbwheel may include a plurality of gear teeth for engagement by the first arm of the spool brake, and the dental flosser may further include a dispensing gear arranged coaxially with the dispensing spool and include a plurality of gear teeth for engagement by the second arm of the spool brake. Application of a tension force to the floss may increase contact forces between the spool brake and the dispensing and collecting spools. The housing may include a base and a cover, the cover may be pivotally connected to a rear end of the housing at a location opposite a front end where the first and second tips are located, and the cover may be releasably held in a closed position by at least one snap feature positioned along a side of the base between the rear and front ends (e.g., at the front end of the cover).

Another aspect of the present disclosure relates to a dental flosser spool that includes a base and a hub mounted to the base. The dental flosser spool is configured to be releasably mounted to a dental flosser, and the hub is receptive of a length of floss to be wound thereon, the length of floss being used floss collected during use of the dental flosser or unused floss wound on the hub prior to use of the dental flosser.

The dental flosser spool may be reversibly mounted in the dental flosser in a first orientation when used floss is wound on the hub, and a second orientation when the unused floss is wound on the hub. The dental flosser spool may be releasably mounted in the dental flosser in a first position for mounting used floss on the hub, and in a second position when mounted with unused floss on the hub. The base may include at least one slit formed therein, the at least one slit providing a connection point of the used floss or unused floss to the dental flosser spool. The base may have a flat disk shape and the hub may have an elongate cylindrical shape. The dental flosser spool may include a key slot configured to receive a spool mounting key of the dental flosser. The dental flosser spool may include a pass-through bore configured to receive a spool mounting member of the dental flosser.

The foregoing has outlined broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

In some embodiments, a dental flosser includes: a handle; a floss support coupled to the handle, the floss support including a first projection having a first tip and a second projection having a second tip; a floss dispensing spool coupled to the handle; a floss collecting spool coupled to the handle; a thumbwheel coupled to the handle, the thumbwheel being configured to rotate the floss collecting spool and cause floss to move from the floss dispensing spool, across the first tip and the second tip, and onto the floss collecting spool; and a spool brake coupled to the handle, the spool brake being configured to move between a first position where the spool brake prevents rotation of the floss dispensing spool and/or the floss collecting spool and a second position where the spool brake allows rotation of the floss dispensing spool and/or the floss collecting spool; wherein the spool brake includes a release arm accessible from an exterior of the dental flosser, the release arm being configured to move the spool brake between the first position and the second position.

In some embodiments, the thumbwheel is accessible from the exterior of the handle. In some embodiments, the thumbwheel is accessible from opposite sides of the exterior of the handle. In some embodiments, the thumbwheel and the release arm extend through a single opening (i.e., the same opening) in the handle. In some embodiments, the thumbwheel and the release arm extend through separate openings in the handle.

In some embodiments, the spool brake includes a brake pad positioned to resist rotation of the floss dispensing spool. In some embodiments, the dental flosser includes a dispensing spindle coupled to the handle, wherein the brake pad is configured to apply a compression force on the dispensing spindle when the spool brake is in the first position.

In some embodiments, the dental flosser includes a dispensing gear coupled to the handle coaxially with the floss dispensing spool and a collecting gear coupled to the handle coaxially with the floss collecting spool, wherein the spool brake is configured to engage at least one of the dispensing gear or the collecting gear when the spool brake is in the first position. In some embodiments, the spool brake is configured to engage both the dispensing gear and the collecting gear when the spool brake is in the first position. In some embodiments, the dispensing gear includes gear teeth that are a different size than gear teeth of the collecting gear. In some embodiments, the collecting gear has a larger diameter than the dispensing gear. In some embodiments, the thumbwheel includes the collecting gear.

In some embodiments, the dental flosser includes at least one floss tensioner positioned in the handle, the at least one floss tensioner being configured to contact the floss and resist movement of the floss from the floss dispensing spool to the floss collecting spool.

In some embodiments, a dental flosser includes: a handle; a floss support coupled to the handle, the floss support including a first projection having a first tip and a second projection having a second tip; a floss dispensing spindle rotatably coupled to the handle; a floss collecting spindle rotatably coupled to the handle; a thumbwheel coupled to the floss collecting spindle, the thumbwheel being configured to rotate the floss collecting spindle and cause floss to move from the floss dispensing spindle, across the first tip and the second tip, and to the floss collecting spindle; and a spool brake coupled to the handle, the spool brake being configured to move between a first position where the spool brake prevents rotation of the floss dispensing spindle and/or the floss collecting spindle and a second position where the spool brake allows rotation of the floss dispensing spindle and/or the floss collecting spindle; wherein the spool brake includes a release arm accessible from an exterior of the dental flosser, the release arm being configured to move the spool brake between the first position and the second position.

In some embodiments, the dental flosser includes a dispensing gear positioned coaxially with the floss dispensing spindle. In some embodiments, the dispensing gear is an integral part of the floss dispensing spindle. In some embodiments, the dental flosser includes a collecting gear positioned coaxially with the floss collecting spindle, the thumbwheel being coupled to the collecting gear.

In some embodiments, the collecting gear is an integral part of the floss collecting spindle. In some embodiments, the thumbwheel and the release arm extend through a single opening in the handle. In some embodiments, the spool brake includes a brake pad positioned to contact and resist rotation of the floss dispensing spindle. In some embodiments, the brake pad is configured to apply a compression force to the floss dispensing spindle when the spool brake is in the first position.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which:

FIG. 9 is a top view of a portion of another example dental flosser in accordance with the present disclosure.

FIG. 10 is a top view of a portion of another example dental flosser in accordance with the present disclosure.

FIG. 11 a top view of a portion of another example dental flosser in accordance with the present disclosure.

FIG. 29 is a flow chart showing steps of an example method in accordance with the present disclosure.

FIGS. 30-31 are perspective views of another embodiment of an assembled dental flosser.

FIG. 32 is a cross-sectional view of the dental flosser in FIGS. 30-31.

DETAILED DESCRIPTION OF EMBODIMENTS

The present disclosure is directed generally to dental flossing devices, and more particularly relates to dental flosser with floss tensioning, dispensing and take up features, and related methods for making and using such dental flossers.

The present disclosure also relates to an improved dental flosser that holds and dispenses floss in a more efficient way for the purpose of flossing teeth. The dental flosser allows a user to advance new floss into a ready-for-use position without contacting the floss, which may lead to improved hygienics and use of less floss. A floss advancing mechanism allows the user to advance the floss while holding the handle and rotating a thumbwheel with a finger or several fingers (and/or thumb) from both or either side of the handle. The fresh floss is dispensed from a spool in the handle and the used floss is collected on a separate spool. Both spools are locked during flossing. An improved spool locking technique on both spindles ensures that freshly dispensed floss is at the proper tension for use. Additionally, friction is applied along the path of the floss to supply tension to the floss as the floss is being advanced. Broken floss can be easily reattached to the collecting spool. In one example, an empty spool that contained the dispensed floss can be flipped and installed to become the used floss take-up spool.

Figure 1:
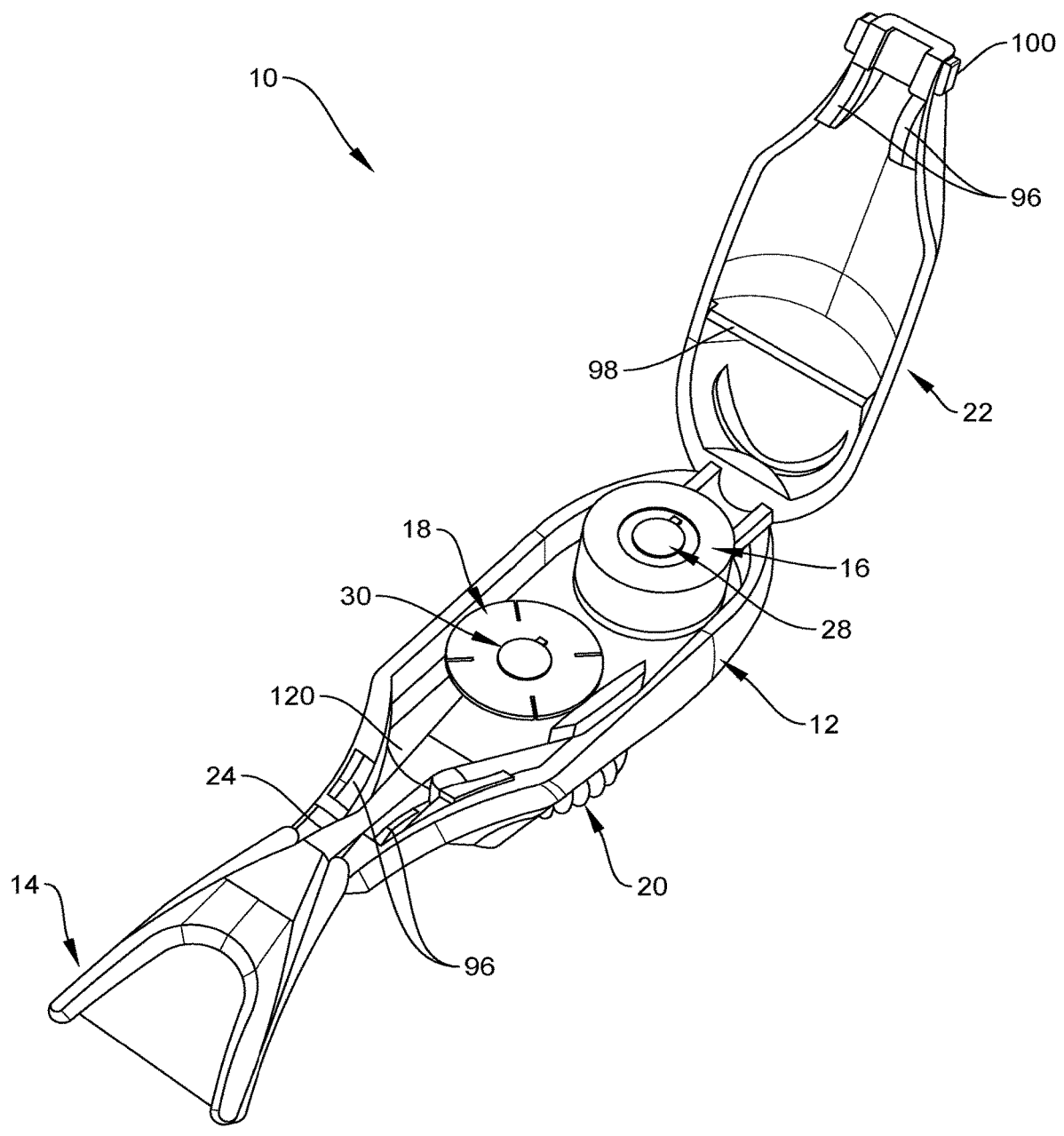
FIG. 1 is a perspective view of an example dental flosser in accordance with the present disclosure.
Figure 2:
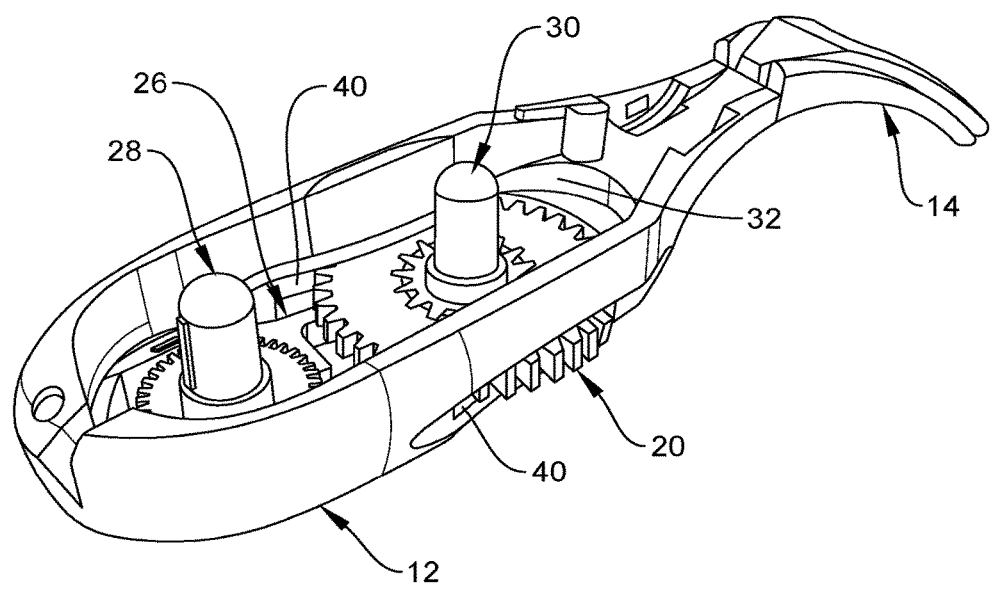
FIG. 2 is a perspective view of a portion of the dental flosser shown in FIG. 1.
Figure 3:
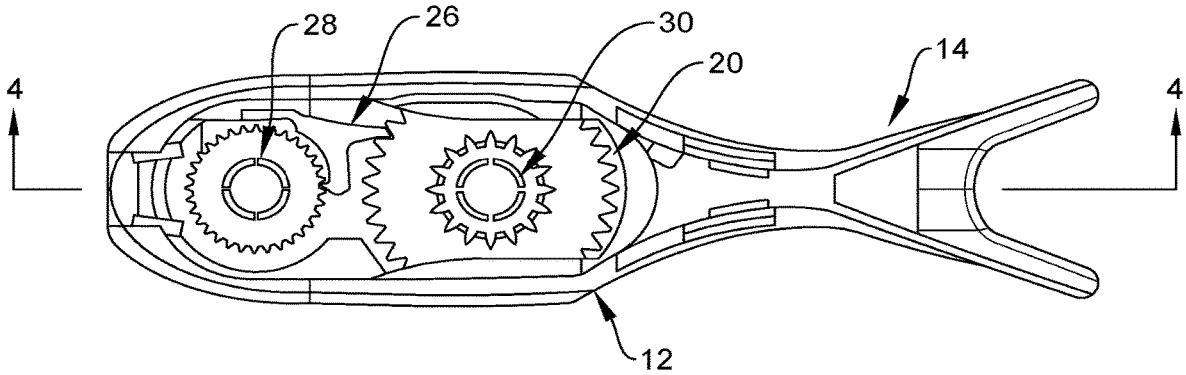
FIG. 3 is a top view of a portion of the dental flosser shown in FIG. 1.
Figure 4:
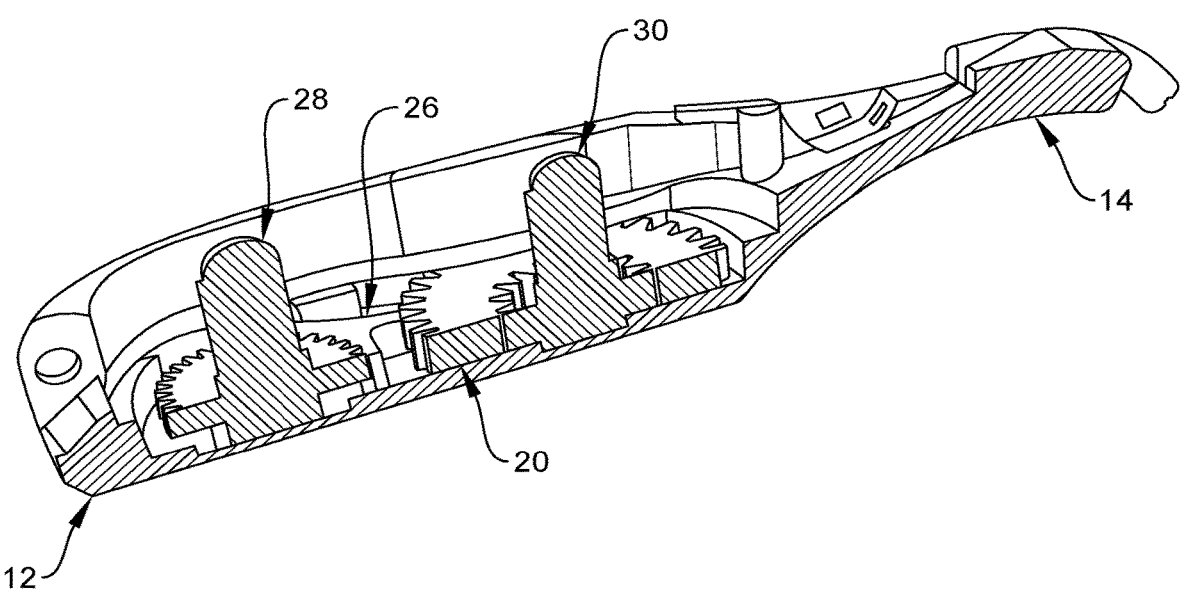
FIG. 4 is a cross-sectional view of the portion of the dental flosser shown in FIG. 3 taken along cross-section indicators 4-4.

FIG. 1 is a perspective view of an example dental flosser or flosser device 10 in accordance with the present disclosure. The dental flosser 10 includes a handle 12 with a cover 22 pivotally connected thereto (the handle and the cover forming a housing). The cover 22 is shown in an open position in FIG. 1. Inside the handle 12, a floss support 14, dispensing spool 16, collecting spool 18, thumbwheel 20, spool brake 26, floss 24, dispensing spindle or unwind spindle 28 and collecting spindle 30 are positioned and enclosed when the cover 22 is in a closed position relative to the handle 12. At least some of these features are additionally shown in the perspective view of FIG. 2, the top view of FIG. 3, and the partial perspective view of FIG. 4.

Figure 5A:
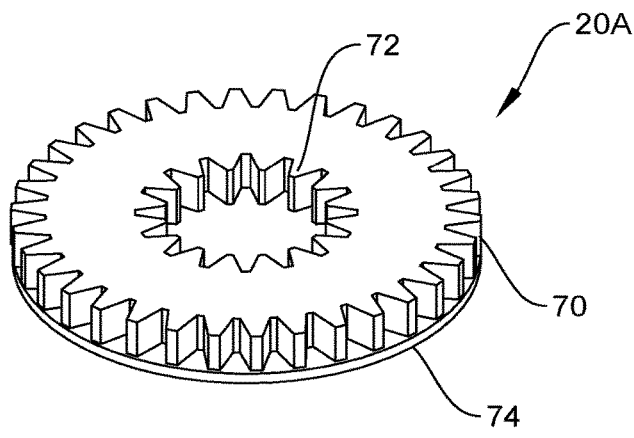
FIG. 5A is a perspective view of an alternative thumbwheel for use in the dental flosser shown in FIG. 1.
Figure 5:
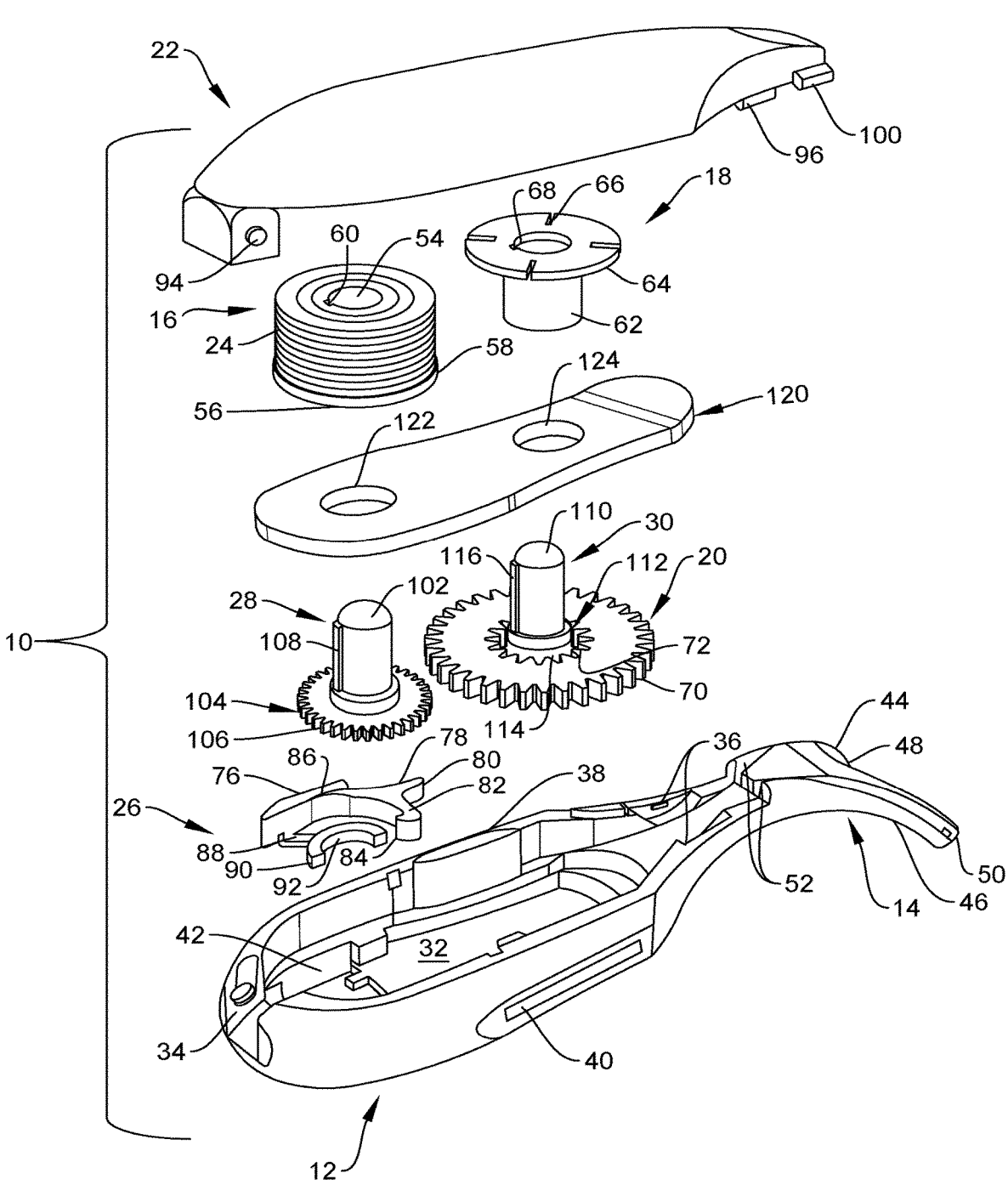
FIG. 5 is an exploded perspective view of the dental flosser shown in FIG. 1.

Referring now to the exploded perspective view of FIG. 5, the handle 12 includes a cavity 32, a cover attachment recess 34, a plurality of latch grooves 36, floss guide 38, wheel slots 40 (see also FIG. 2), and a brake recess 42. A floss guide 38 may be positioned in the cavity 32 and adjacent to the collecting spool 18. The floss guide 38 may have any of a variety of shapes and sizes. The floss guide 38 may be positioned extending parallel with a side wall of the handle 12 and may be positioned adjacent to the collecting spool 18. The floss guide 38 may provide additional friction to help maintain tension in the floss 24.

The wheel slots 40 may be formed in the handle 12 adjacent to the thumbwheel 20. The wheel slots 40 may be formed along opposite sides of the handle 12. The wheel slots 40 may be sized to permit lateral insertion of the thumbwheel 20 into the cavity 32. Once the thumbwheel 20 is inserted through the wheel slots 40, the collecting spindle

30 and collecting spool 18 may be mounted to the thumbwheel 20. The brake recess 42 may be sized to receive a portion of brake 26 for purposes of mounting the brake 26 to the handle 12. The brake recess 42 may be positioned along one of the side walls of the handle 12, such as along a side wall adjacent to the dispensing spool 16 as shown in, for example, FIG. 2. The brake recess 42 may be positioned at any desired location relative to the handle 12 and the dispensing and collecting spindles 28, 30.

The handle 12 is designed to be easily held in one hand by the user. The handle 12 has a size and shape that permits grasping by one hand of a user while orienting a thumb, finger, multiple fingers, both a thumb and a finger, or a palm of the user along the opposite sides of the handle for purposes of grasping the handle 12 and/or operating the thumbwheel 20. The dental flosser 10 may have a reduced thickness portion at an intersection between the handle 12 and floss support 14, which may provide improved maneuverability and grasping of the dental flosser 10 during use.

The floss support 14 includes first and second arms 44, 46 having first and second tips 48, 50, respectively. The first and second arms 44, 46 are mounted to the handle 12 at one end and have the first and second tips 48, 50 positioned at an opposite end spaced away from the handle 12. A plurality of floss tracks 52 extend from the cavity 32 of the handle 12 to the first and second tips 48, 50. The tracks 52 are arranged to direct the floss 24 from the dispensing spool 16 to the tips 48, 50, and back to the collecting spool 18. The tracks 52 may also provide resistance for the floss 24 that provides improved tension in the floss 24 during use.

The first and second arms 44, 46 may have a contoured shape that promotes positioning of the first and second tips 48, 50 (with the floss 24 extending therebetween) adjacent to teeth in a user's mouth. The arms 44, 46 may diverge from each other along their lengths towards the tips 48, 50. The arms 44, 46 may define a generally U-shaped or generally V-shaped structure. The tracks 52 may extend along an entire length of the arms 44, 46. The tips 48, 50 can optionally have a hole (not shown) or a notch (not shown) to help hold the floss 24 on the tips 48, 50 during use. The tracks 52 may be partially or completely covered to provide for a more aesthetically pleasing dental flosser 10. The tracks 52 may be covered to help reduce exposure of the floss 24 (i.e., the clean unused portion or the contaminated used portions of the floss 24).

The dispensing spool 16 includes a hub 54, a base 56, a plurality of slits 58, and a key slot 60. The dispensing spool 16 is configured to have the floss 24 wound thereon. A free end of the floss 24 may be inserted into one or more of the slits 58 to hold the floss 24 in place while the floss is wrapped around the hub 54. The hub 54 includes a pass-through bore and the key slot 60 is exposed along the bore. The bore is configured to receive a portion of the dispensing spindle 28 as will be described in further detail below. The key slot 60 may be configured to receive a key or key member 108 of the dispensing spindle 28 to provide a more secure connection therebetween for transfer of torque forces.

The dispensing spool 16 may include the base 56 on one end of the hub 54 or on both ends of the hub 54. The base 56 may be free of the slits 58 or have only a single slit 58. In some embodiments, a slit or other floss connecting feature is formed in the hub 54. Typically, the floss 24 is wound around the hub 54 and then slid into one or more of the slits 58 to help lock the floss into position on the dispensing spool 16 so the floss does not slip when the dispensing spool 16 is turned to take up the floss during operation of the dental flosser 10. In some embodiments, it may be possible to secure the floss 24 on the dispensing spool 16 without engaging the floss in one of the slits 58, such as if the dispensing spool 16 does not include a slit 58 or other floss securing feature. For example, it may be possible to wind enough floss around the hub 54, and/or with enough tension on the hub 54, that the floss will lock or otherwise hold itself from slipping relative to the hub 54. In some cases, it may require more floss and/or wraps of the floss around the hub 54 to hold the floss in this way compared to using a slit 58 or other attachment feature that provides a more positive connection between the floss 24 and dispensing spool 16.

The collecting spool 18 may also include a hub 62, base 64, slits 66 and a key slot 68. The collecting spool 18 is configured to have used floss 24 wound thereon. A free end of the used floss 24 may be inserted into one or more of the slits 66 to retain the floss 24 in place while the floss 24 is wound around the hub. The hub 62 may include a pass-through bore and the key slot 68 is exposed along the pass-through bore. The pass-through bore is sized to receive a portion of the collecting spindle 30 as will be described in further detail below. In at least some arrangements, the collecting spool 18 has the same or similar size, shape and construction as the dispensing spool 16. In some examples, the dispensing spool 16, after the floss 24 is removed therefrom, can be inserted onto the collecting spindle 30 and used as the collecting spool 18. The dispensing and collecting spools 16, 18 can be interchangeable with each other. In at least one arrangement, the dispensing spool 16 may be positioned with the base 56 arranged downward along the base of the dispensing spindle 28, and the collecting spool 18 has the base 64 arranged facing upward along an upper end of the collecting spindle 30 (see FIG. 1).

The thumbwheel 20 may have a generally disc-shaped construction. A plurality of gear teeth 70 may be formed around a peripheral edge of the thumbwheel 20. The gear teeth 70 may have a dual function as gear teeth used to engage with the brake 26 to help control rotation of the thumbwheel 20, and as a gripping structure to provide improved grip for purposes of rotating the thumbwheel 20 by a thumb and/or finger(s) of the user.

The thumbwheel 20 may also include a toothed pass-through bore 72. The toothed bore 72 may be configured to receive a portion of the collecting spindle 30 as will be described in further detail below. The toothed bore 72 may provide a secure interface between the thumbwheel 20 and the collecting spindle 30 to translate a rotation force applied to the thumbwheel 20 to a rotation force applied to the collecting spindle 30.

In some arrangements, such as the embodiment shown in FIG. 5A, the thumbwheel 20 may include a comfort ring 74. The comfort ring 74 may be positioned around a peripheral edge of the thumbwheel 20 adjacent to the gear teeth 70. The comfort ring 74 may be arranged along a top and/or bottom surface thereof to permit interaction between the gear teeth 70 and the brake 26 while also providing improved comfort for the user to engage the thumbwheel 20 along its peripheral edge. In some arrangements, separate comfort rings 74 are positioned on opposite top and bottom sides of the thumbwheel 20.

The brake 26 includes a handle connector 76, a thumbwheel arm 78 having a tip 80, a dispensing spool arm 82 having a tip 84, a hinge 86, a brake pad arm 88, and a brake pad 90 having a spindle surface 92. The handle connector 76 is arranged and sized to fit in the brake recess 42 of the handle 12. The handle connector 76 may be removably inserted into the brake recess 42.

The thumbwheel arm 78 is arranged to engage the gear teeth 70 of the thumbwheel 20. Rotating the thumbwheel 20 in a rotation direction that takes up the floss on the collecting spool 18 moves the tip 80 out of the gear teeth 70, and releasing a rotational force applied to the thumbwheel 20 permits the tip 80 to be reinserted into one of the gear teeth 70, thus locking the thumbwheel 20 in a fixed position.

The dispensing spool arm 82 may extend at an angle relative to the thumbwheel arm 78. In one example, the dispensing spool arm 82 is arranged at an angle of about 90 degrees relative to the thumbwheel arm 78. In other examples, the dispensing spool arm 82 is arranged at an angle in the range of about 0 degrees to about 180 degrees relative to the thumbwheel arm 78. The dispensing spool arm 82 arranges the tip 84 adjacent to the dispensing spindle 28 to engage the tip 84 within gear teeth 106 of a gear 104 of the dispensing spindle 28. When the tip 84 is engaged with the gear teeth 106, the brake 26 locks the dispensing spindle 28 in a fixed rotated position. When the tip 84 moves out of engagement with the gear teeth 106, the dispensing spindle 28 is free to rotate, thus permitting floss 24 to unravel or dispense from the dispensing spool 16.

Since the thumbwheel arm 78 and dispensing spool arm 82 are formed as a single, unitary piece, rotating the thumbwheel 20 moves the tip 80 out of engagement with the gear teeth 70 of the thumbwheel 20 and concurrently moves the tip 84 out of engagement with the gear teeth 106 of the dispensing spindle 28. Thus, rotating the thumbwheel 20 concurrently takes up used floss 24 about the collecting spool 18 and releases unused floss 24 to be dispensed from the dispensing spool 16.

The hinge 86, brake pad arm 88 and brake pad 90 provide an additional function for the brake 26 in addition to positioning the tips 80, 84 into and out of engagement with the gear teeth of the thumbwheel 20 and dispensing spindle 28. The hinge 86 may be integrally formed as a single piece with remaining portions of the brake 26 (i.e., the handle connector 76). The hinge 86 is connected to the brake pad arm 88, which carries the brake pad 90. The brake pad arm 88 may have any desired shape or size to provide different amounts of flexibility and/or stiffness for application of a braking function on the dispensing spindle 28. The brake pad arm 88 is shown having a generally V-shaped construction with an arm or hinge point. Other configurations having different shapes and sizes are possible.

The brake pad 90 has a generally arcuate shape, or at a minimum defines the spindle surface 92 with a generally arcuate shape that is sized to engage a meeting arcuate surface of the dispensing spindle 28. In operation, when the tips 80, 84 are engaged with respective gear teeth of the thumbwheel 20 and collecting spindle 30, the spindle surface 92 of the brake pad 90 is pressed against the dispensing spindle 28 thereby causing friction that resists rotation of the dispensing spindle 28. This friction force and resistance to rotation of the dispensing spindle 28 may help maintain tension in the floss 24 across the first and second tips 48, 50.

The brake pad 90 may have any desired shape and size to interface with the dispensing spindle 28 to provide the desired resistance to rotation of the dispensing spindle 28. In other arrangements, the hinge 86, brake pad arm 88, and brake pad 90 may be formed as a separate piece from remaining portions of the brake 26 and mounted separately to the handle 12. In further embodiments, all features of the brake 26 may be integrally formed as a single piece and mounted together as an assembly to the handle 12 (i.e., via the brake recess 42). In other arrangements, as described below with reference to FIGS. 6-18, the brake 26 may have a variety of different shapes, sizes and interfaces with other features of the dental flosser in order to provide a desired brake function for one or more of the dispensing spool 16 and collecting spool 18.

One advantage of the brake 26 shown and described with reference to FIGS. 1-5 is that when the brake 26 is engaged with the thumbwheel 20 and dispensing spindle 28, application of a tension force to the floss 24 tends to more tightly lock the dispensing and collecting spools 16, 18 in a fixed rotated position rather than tending to loosen one or both of the dispensing and collecting spools 16, 18. Thus, the brake 26 is designed to maintain tension in the floss 24 during dispensing and taking up of the floss 24 and during use of the floss 24 to clean a user's teeth.

The brake thumbwheel arm 78 and brake dispensing spool arm 82 are arranged such that the thumbwheel 20 is only able to rotate in one direction. Attempting to rotate the thumbwheel 20 in an opposite direction from a direction that would take up the floss about the collecting spool 18, would lock the thumbwheel 20 with the brake 26 in that opposite rotated direction. The dispensing spool arm 82 is similarly arranged and constructed to prevent rotation of the dispensing spool 16 and dispensing spindle 28 in a direction opposite what is required to release floss 24 from the dispensing spool 16. Referring now to FIGS. 1 and 5, the cover 22 is shown including a hinge member 94, a plurality of latch members 96, a floss height guide 98, and one or more lift tabs 100. The hinge member 94 is sized and configured to engage with the cover attachment recess 34 of the handle 12 to provide a connection therebetween. The hinge member 94 may provide a pivotal connection between the handle 12 and cover 22. The latch members 96 may releasably engage with the latch grooves 36 of the handle 12. The latch members 96 may be positioned along an interior edge or side of the cover 22 to be retained within the cavity 32 of the handle 12 when the cover 22 is in a closed position. In other embodiments, the latch members 96 may be positioned at any desired location on the cover 22 to provide the desired releasable latching connection with the handle 12. In at least some embodiments, the latch members 96 may have a deflectable or deformable construction to provide a snap-fit connection between the cover 22 and handle 12.

The floss height guide 98 may extend from the cover 22 interior towards the floss 24 that is extending from the dispensing spool 16 towards the floss support 14. The floss height guide 98 may apply a contact force to the floss 24 to hold the floss in a desired vertical position within the handle 12 (i.e., the vertical position being in a direction from the thumbwheel 20 towards the cover 22). The lift tabs 100 may be positioned along an end or side of the cover 22 for a user to grasp to apply a force that disconnects the latch members 96 from the latch grooves 36. The lift tabs 100 may have any desired shape and size and be positioned at a location along a perimeter edge of the cover 22.

The dispensing spindle 28 may include a hub 102, a gear or spindle gear 104, gear teeth or spindle teeth 106, and a key 108. The collecting spindle 30 may include a hub 110, a gear 112 having gear teeth 114, and a key 116 extending along the length of the hub 110. The hub 102 with key 108 is sized to receive the dispensing spool 16 to provide a connection therebetween. The key 108 ensures concurrent rotation of the dispensing spool 16 with the dispensing spindle 28. The gear teeth 106 are arranged for contact by the tip 84 of the dispensing spool arm 82 of the brake 26. The gear teeth 106 may have a different size and shape as compared to the gear teeth 70 of the thumbwheel 20. As such, the brake 26 provides increased control of rotation (i.e., a finer control due to smaller teeth) for dispensing of the floss 24 from the dispensing spool 16. The different-sized gear teeth 106 relative to gear teeth 70 may also influence selection of the size and shape of the tips 84, 80 that interface with those gear teeth. For example, the tip 80 has a larger size and slightly different shape than the tip 84 as shown in at least FIG. 5 to better interface with the larger sized gear teeth 70. Having smaller teeth on the dispensing spindle 28 allows the brake 26 to interact with the dispensing spindle 28 when the spindle has smaller angles of rotation, and thus a more finely controlled rotation of the dispensing spindle 28. As a result, the dispensing spool arm 82 can lock the dispensing spindle 28 with smaller degrees of rotation and at higher tension forces. With smaller teeth, less unwind rotation is needed to allow the dispensing spool arm 82 to seat into position in the gear teeth 106, thus resulting in higher tension in the floss.

The hub 110 and key 116 of the collecting spindle 30 are sized to receive the hub 62 of the collecting spool 18. The key 116 ensures that the collecting spool 18 rotates concurrently with the collecting spindle 30 and may provide a more secure connection therebetween.

The gear 112 with gear teeth 114 are sized to mate with the toothed bore 72 of thumbwheel 20. The connection between gear 112 and the toothed bore 72 ensure that rotation of the thumbwheel 20 directly translates to rotation of the collecting spindle 30. Separating the thumbwheel 20 from the collecting spindle 30 may provide improved ease of assembling the dental flosser 10. Providing the thumbwheel 20 as a separate piece makes it possible to insert the thumbwheel 20 through the wheel slots 40 into the cavity 32 of the handle 12, and thereafter the gear 112 of the collecting spindle 30 may be engaged within the toothed bore 72 to provide an assembly. This multi-piece assembly may make it possible for the dental flosser 10 to have a more compact size and be more easily assembled.

The dental flosser 10 may also include a barrier member 120, as shown in FIGS. 1 and 5. The barrier member 120 may be positioned within the handle 12 between the dispensing and collecting spools 16, 18 and the area in the handle 12 where the thumbwheel 20, gear 104 and gear 112 are located. The barrier member 120 may include openings 122, 124 through which the hubs 102, 110 extend, respectively. The barrier member 120 may be secured to the handle 12 with a snap-fit connection, adhesives, a fastener, or other connecting feature.

In addition to the features discussed above which apply tension to the floss 24 or friction along its length, the tension of the floss 24 can be supplied by applying other types of friction along its path. For example, the dental flosser 10 may include other structures or devices about which the floss 24 must pass along its path. An appropriate amount of tension may be designed into the floss 24 path. Similarly, the flexing of one or both of the thumbwheel arm 78 and dispensing spool arm 82 can be accomplished through the use of a separate spring, tensioning arm, or the like, rather than relying on the natural elastic properties of the material comprising the arms 78, 82. Also, different arrangements of gears can be used to transmit the motion of the user's finger/thumb to rotation of the collecting spool 18. The features of dental flosser 10 that help maintain tension of the dental flosser 10 prior to, during, and after take-up of used floss 24 onto the collecting spool 18, allows the user to immediately use the dental flosser 10 with limited additional interactions with the dental flosser 10 to achieve the proper tension along the floss 24. In this way, the user can more easily and quickly place fresh floss in a position to be used without handling the used floss. If the dental floss 24 breaks, the user can manually advance sufficient floss, thread the floss 24 along the tracks 52 and the arms 44, 46 to the tips 48, 50 and reattach the floss 24 to the collecting spool 18 by placing the floss 24 within one of the slits 66. Overall, the user's contact with the dental floss 24 is minimized. Furthermore, the dental flosser 10 is operable in a relatively simple way to add or remove one or both of the dispensing spool 16 and collecting spool 18 and operating the device 10 to provide a relatively taut floss 24 for use in flossing a user's teeth.

Figure 6:
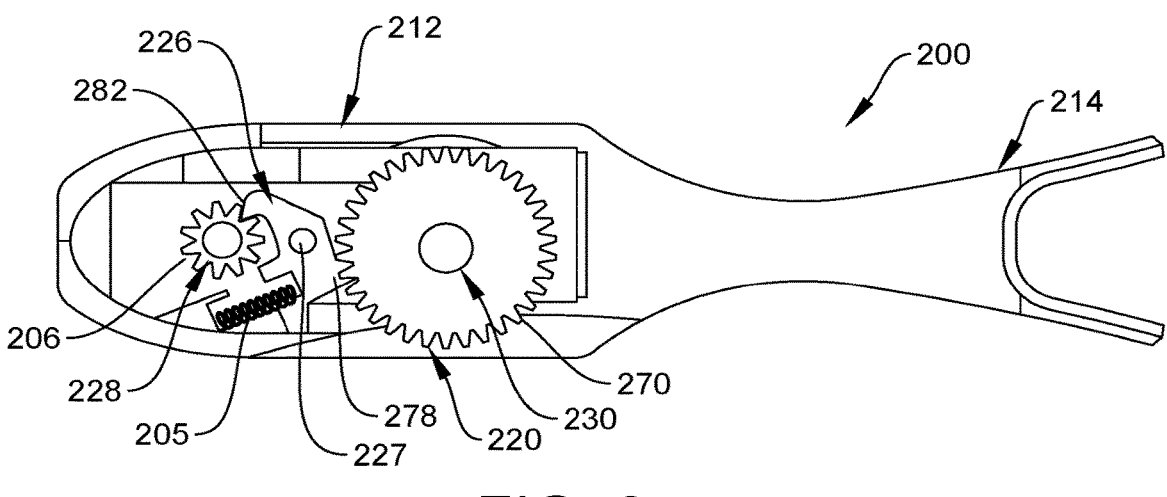
FIG. 6 is a top view of a portion of another example dental flosser in accordance with the present disclosure.

Referring now to FIGS. 6-18, further example dental flossers are shown having a variety of different configurations for the brake and other features to control rotation of the dispensing and collecting spools. FIG. 6 illustrates a dental flosser 200 having a handle 212, floss support 214, thumbwheel 220, brake 226, and dispensing and collecting spindles 228, 230. The thumbwheel 220 includes gear teeth 270. The brake 226 includes a thumbwheel arm 278 and dispensing spool arm 282. The dispensing spindle 228 includes gear teeth 206. The brake 226 is mounted to the handle 212 with a brake pivot member 227 rather than along a perimeter edge of the handle 212. The thumbwheel 220 and dispensing spool arms 278, 282 contact the gear teeth 270, 206 at different locations around the perimeter of the thumbwheel 220 and the dispensing spindle 228, respectively. The brake 226 has a significantly different size, shape and mounting location as compared to other embodiments. The brake 226 is held in engagement with the gear teeth 270, 206 with a biasing force applied by a spring 205. The spring 205 may be interposed between the handle 212 and a portion of the brake 226. Rotating the thumbwheel 220 to take up used floss rotates the brake 226 against the biasing force of the spring 205. Upon stopping rotation of the thumbwheel 220, the spring 205 forces the thumbwheel 220 and dispensing spool arms 278, 282 back into engagement with the gear teeth 270, 206, respectively.

Figure 7:
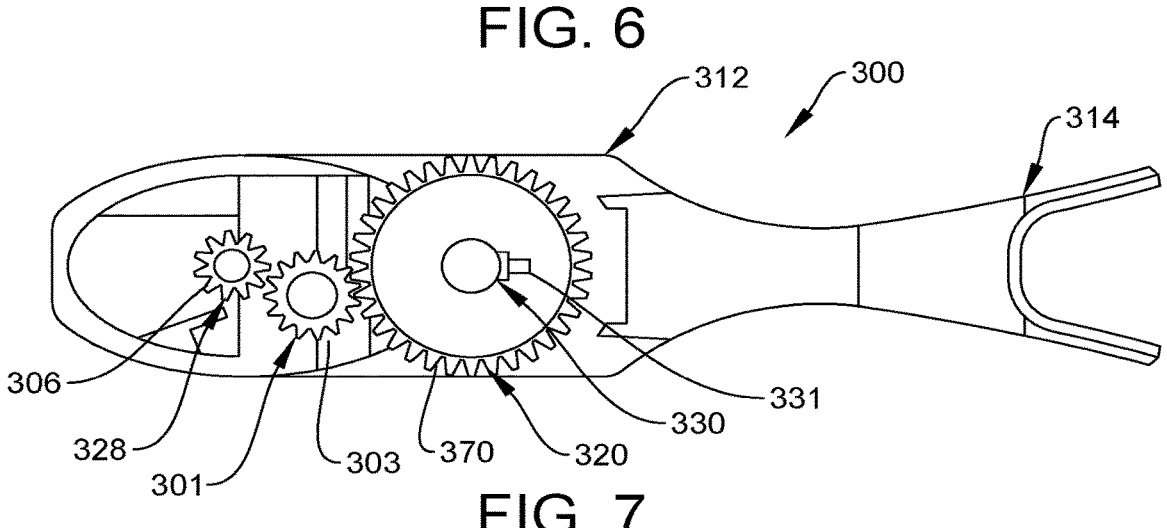
FIG. 7 is a top view of a portion of another example dental flosser in accordance with the present disclosure.

FIG. 7 illustrates another example of a dental flosser 300 that includes a handle 312, floss support 314, thumbwheel 320, dispensing spindle 328, collecting spindle 330, and an intermediate gear 301. The thumbwheel 320 has a plurality of gear teeth 370. The dispensing spindle 328 has a plurality of gear teeth 306. The intermediate gear 301 includes a plurality of gear teeth 303 that engage the gear teeth 370, 306. A friction member 331 applies a friction force to the collecting spindle 330 that resists rotation of the thumbwheel 320 unless sufficient rotational force is applied. The intermediate gear 301 translates the rotation force from the thumbwheel 320 directly to the dispensing spindle 328. The friction member 331 may have a variety of different configurations and include different types of material. For example, the friction member 331 may comprise a rubber material that is pressed against a hub of the collecting spindle 330.

Figure 8:
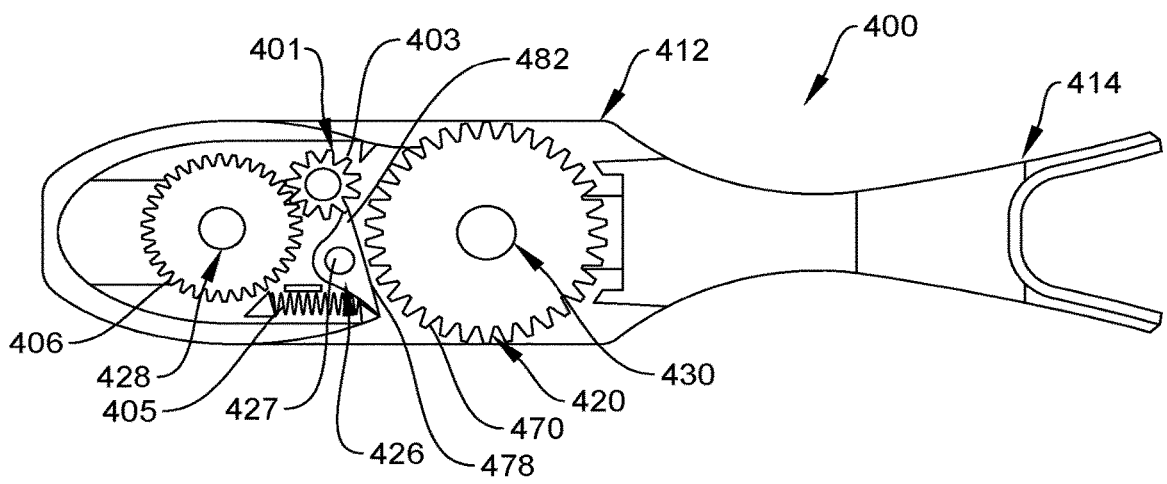
FIG. 8 is a top view of a portion of another example dental flosser in accordance with the present disclosure.

FIG. 8 illustrates another example of a dental flosser 400 that includes a handle 412, a floss support 414, a thumbwheel 420, a brake 426, a dispensing spindle 428, a collecting spindle 430, an intermediate gear 401, and a spring 405 that biases the brake 426 into a position engaging the thumbwheel 420 and the intermediate gear 401. The thumbwheel 420 includes a plurality of gear teeth 470. The dispensing spindle 428 includes a plurality of gear teeth 406. The intermediate gear 401 includes a plurality of gear teeth 403 that engage the gear teeth 406. The brake 426 includes a thumbwheel arm 478 that engages the gear teeth 470 of the thumbwheel 420, and a dispensing spool arm 482 that engages the gear teeth 403 of the intermediate gear 401. Applying a rotation force to the thumbwheel 420 releases the thumbwheel arm 478 from the gear teeth 470 and the dispensing spool arm 482 from the gear teeth 403 of the intermediate gear 401 to allow rotation of the dispensing spindle 428. Once the rotation force is released from the thumbwheel 420, the spring 405 biases the thumbwheel arm 478 and the dispensing spool arm 482 into engagement with the respective gear teeth 470, 403.

FIG. 9 illustrates another example of a dental flosser 500 that includes a handle 512, a floss support 514, a thumbwheel 520 having gear teeth 570, a first brake 526 having a thumbwheel arm 578 and first brake arm 507, a second brake member 509 having a collecting spool arm 511 and second brake arm 513, and dispensing and collecting spindles 528, 530. The dispensing spindle 528 includes a plurality of gear teeth 506. A spring 505 biases the first brake 526 into engagement with the gear teeth 570 and the second brake arm 513, thereby biasing the collecting spool arm 511 into engagement with the gear teeth 506. When a rotation force is applied to the thumbwheel 520 to take up the used floss, the thumbwheel arm 578 moves out of engagement with the gear teeth 570 and the second brake member 509 rotates to move the collecting spool arm 511 out of engagement with the gear teeth 506 so that the dispensing spindle 528 can rotate to release unused floss. Releasing the rotation force to the thumbwheel 520 allows the spring 505 to apply a biasing force that reengages the arms 578, 511 with the respective gear teeth 570, 506 of the thumbwheel 520 and the dispensing spindle 528.

The interface between the first and second brake arms 507, 513 may be a cam surface interface that provides variable amounts of rotation of the second brake member 509 relative to rotation of the first brake 526. Other types of interfaces may be possible between the arms 507, 513. Furthermore, a second spring or other biasing member may be operable to hold the second brake member 509 in a rest position in which the collecting spool arm 511 engages the gear teeth 506.

FIG. 10 illustrates another example of a dental flosser 600 that includes a handle 612, floss support 614, a thumbwheel 620, first and second brakes 626, 609, dispensing and collecting spindles 628, 630, and a spring 605. The thumbwheel 620 includes gear teeth 670. The dispensing spindle 628 includes gear teeth 606. The first brake 626 includes a thumbwheel arm 678 and a first arm 607. The second brake 609 includes a collecting spool arm 611, a second arm 613, and a third arm 615. The first and second arms 607, 613 may engage such as with a cam surface interface. The third arm 615 may act as a biasing member that biases the second brake 609 into a position in which the collecting spool arm 611 engages the gear teeth 606. Rotating the thumbwheel 620 may move the thumbwheel arm 678 out of engagement with the gear teeth 670 and rotate the second brake 609 to move the collecting spool arm 611 out of engagement with the gear teeth 606. Releasing the rotation force on the thumbwheel 620 permits the spring 605 to bias the brake 626 such that the thumbwheel arm 678 reengages with the gear teeth 670 and permits the collecting spool arm 611 to reengage with the gear teeth 606.

FIG. 11 illustrates a dental flosser 700 that includes a handle 712, a floss support 714, a thumbwheel 720, a brake 726, dispensing and collecting spindles 728, 730, and an intermediate gear 701. The thumbwheel 720 includes gear teeth 770. The dispensing spindle 728 includes gear teeth 706. The intermediate gear 701 includes gear teeth 703. The brake 726 includes a thumbwheel arm 778 and a second arm 711. Application of a rotation force to the thumbwheel 720 moves the thumbwheel arm 778 out of engagement with the gear teeth 770 and the second arm 711 out of engagement with the gear teeth 703 of the intermediate gear 701, thus permitting the dispensing spindle 728 to rotate freely. The brake 726 may include an additional arm 713 that acts as a biasing member to hold the brake 726 in a rotated position in which the thumbwheel arm 778 is engaged with the gear teeth 770. The arm 713 may interface with a side wall of the handle 712 or other feature and may have a size and shape that provides the desired biasing force.

Figure 12:
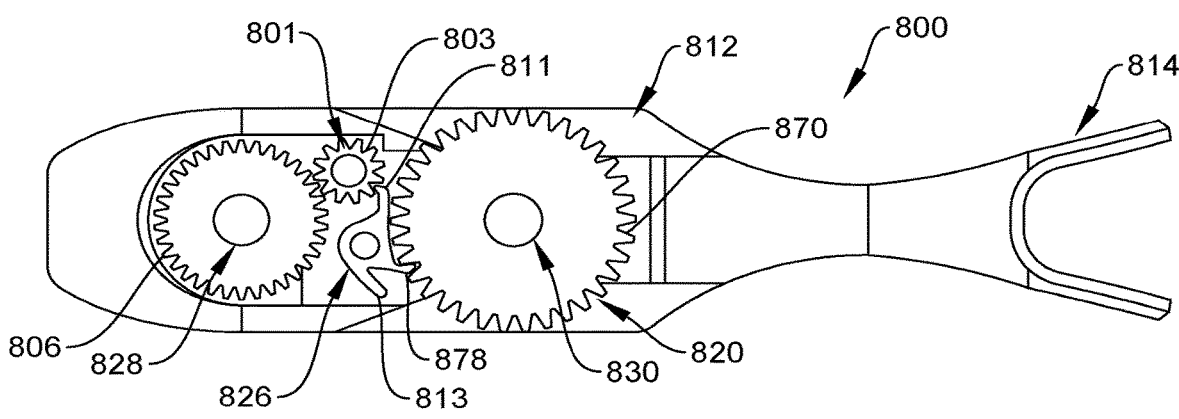
FIG. 12 is a top view of a portion of another example dental flosser in accordance with the present disclosure.

FIG. 12 illustrates a dental flosser 800 that includes a handle 812, floss support 814, thumbwheel 820, brake 826, dispensing and collecting spindles 828, 830, and an intermediate gear 801. The thumbwheel 820 includes gear teeth 870. The dispensing spindle 828 includes gear teeth 806. The intermediate gear 801 includes gear teeth 803. The brake 826 includes a thumbwheel arm 878, a first arm 811, and a second arm 813. The thumbwheel arm 878 engages with the gear teeth 870. The first arm 811 engages with gear teeth 803 at the intermediate gear 801. The second arm 813 engages a portion of the handle 812 to apply a biasing force that rotates the brake 826 to engage the thumbwheel arm 878 with the gear teeth 870. Applying a rotation force to the thumbwheel 820 removes the thumbwheel arm 878 from the gear teeth 870 and removes the first arm 811 from the gear teeth 803, thereby permitting the intermediate gear 801 and dispensing spindle 828 to rotate freely. FIG. 12 shows an arrangement in which the intermediate gear 801 and brake 826 are on opposite sides of a center line passing through the rotation axes of the dispensing and collecting spindles 828, 830. FIG. 11 shows an opposite arrangement in which the intermediate gear 701 and brake 726 are positioned on opposite sides of the same center line.

Figure 13:
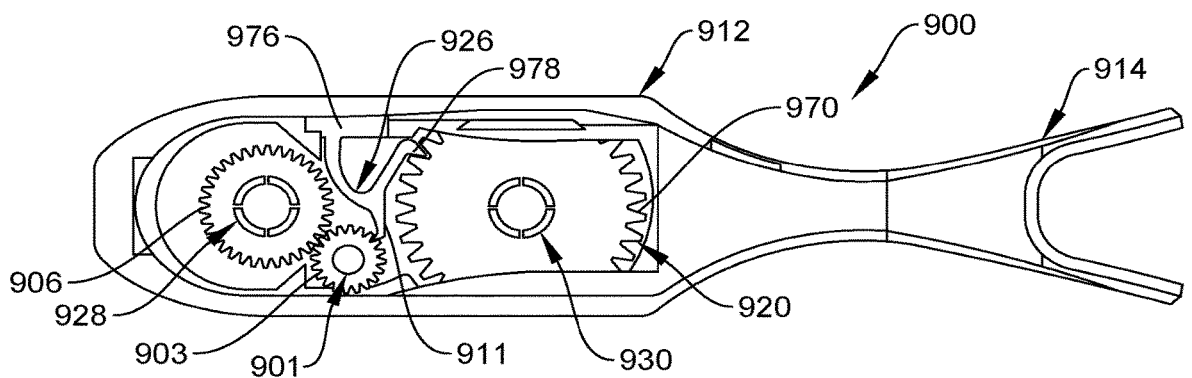
FIG. 13 is a top view of a portion of another example dental flosser in accordance with the present disclosure.

FIG. 13 illustrates a dental flosser 900 that includes a handle 912, floss support 914, thumbwheel 920, brake 926, dispensing and collecting spindles 928, 930, and intermediate gear 901. The thumbwheel 920 includes gear teeth 970. The dispensing spindle 928 includes gear teeth 906. The intermediate gear 901 includes gear teeth 903 that engage the gear teeth 906 on the dispensing spindle 928. The brake 926 includes a thumbwheel arm 978 and a first arm 911, as well as a handle connector 976 that connects the brake 926 to the handle 912. The thumbwheel arm 978 engages the gear teeth 970, and the first arm 911 engages the gear teeth 903 of intermediate gear 901. The brake 926 has a construction in which a biasing force is built into the construction (i.e., shape, size, and materials) of the brake 926 between the handle connector 976 and the arms 978, 911. Applying a rotation force to the thumbwheel 920 moves the thumbwheel arm 978 out of engagement with the gear teeth 970 and the first arm 911 out of engagement with the gear teeth 903, thus permitting the intermediate gear 901 and the dispensing spindle 928 to freely rotate. Removing the rotation force to the thumbwheel 920 permits the brake 926 to bias itself back into engagement with the gear teeth 970, 903. The brake 926 is mounted solely by its connection to the handle 912 via the handle connector 976 rather than using a brake pivot member (e.g., pivot member 227 described above with reference to FIG. 6) at a second location.

Figure 14:
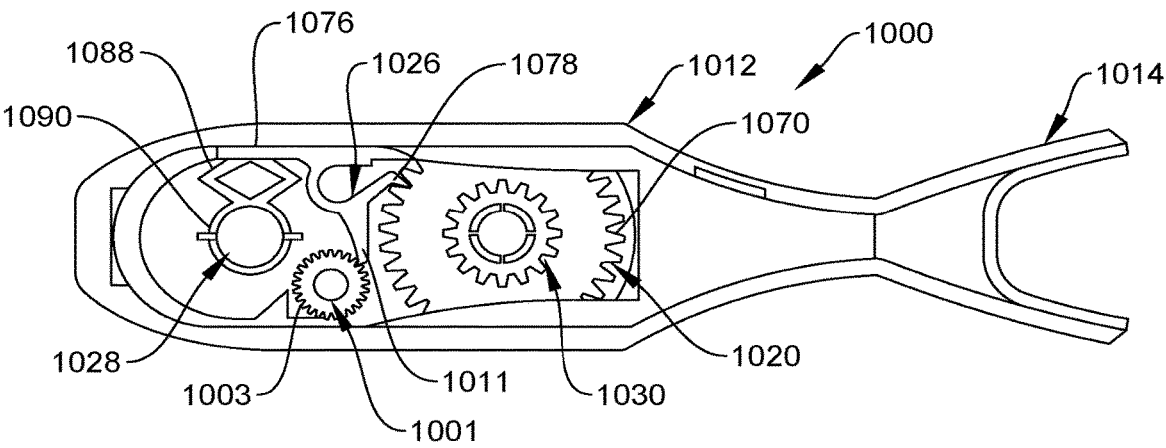
FIG. 14 is a top view of a portion of another example dental flosser in accordance with the present disclosure.

FIG. 14 illustrates a dental flosser 1000 that includes a handle 1012, a floss support 1014, a thumbwheel 1020, a brake 1026, dispensing and collecting spindles 1028, 1030, and an intermediate gear 1001. The thumbwheel 1020 includes gear teeth 1070. The intermediate gear 1001 includes gear teeth 1003. The brake 1026 includes a thumbwheel arm 1078 and a first arm 1011, and a handle connector 1076 that is mounted to the handle 1012. A brake pad arm 1088 and associated brake pad 1090 may be provided as a separate piece, or alternatively may be formed as a single unitary piece with remaining portions of the brake 1026. The brake pad 1090 may apply a friction force to the dispensing spindle 1028 to resist rotation of the dispensing spindle 1028, thereby providing improved tension in the floss 24 during take-up of used floss about the collecting spindle 1030. Applying a rotation force to the thumbwheel 1020 removes the thumbwheel arm 1078 from engagement with the gear teeth 1070, and the first arm 1011 from the gear teeth 1003 of the intermediate gear 1001. Although not shown, the dispensing spindle 1028 may also include a gear having a plurality of gear teeth 1006 that engage the gear teeth 1003 as well. Thus, when the intermediate gear 1001 is free to rotate, the dispensing spindle 1028 is also free to rotate. The gear of the dispensing spindle 1028 is removed in FIG. 14 to illustrate the shape, size and arrangement of the brake pad arm 1088 and brake pad 1090 about a hub of the dispensing spindle 1028. Releasing the rotation force applied to the thumbwheel 1020 permits the brake 1026 to bias itself back into engagement with the gear teeth 1070, 1003, thus locking rotation of the dispensing and collecting spindles 1028, 1030.

Figure 15:
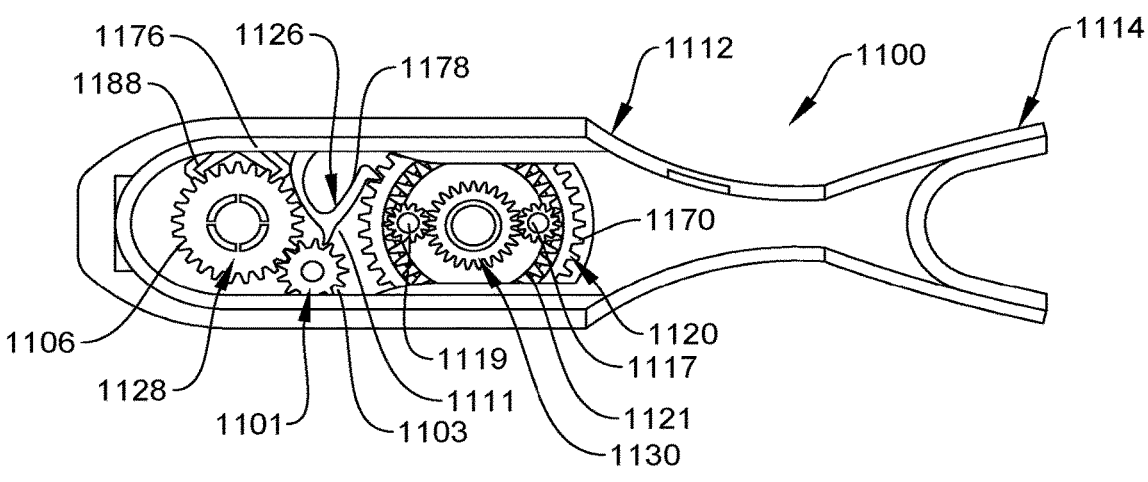
FIG. 15 is a top view of a portion of another example dental flosser in accordance with the present disclosure.

FIG. 15 shows a dental flosser 1100 having a handle 1112, a floss support 1114, a thumbwheel 1120, a brake 1126, dispensing and collecting spindles 1128, 1130, and an intermediate gear 1101 having gear teeth 1103. The thumbwheel 1120 includes gear teeth 1170. The dispensing spindle 1128 includes gear teeth 1106. The brake 1126 includes a thumbwheel arm 1178, a first arm 1111, and a handle connector 1176. The brake 1126 may also include a brake pad arm 1188 and brake pad (not shown). The thumbwheel 1120 and the collecting spindle 1130 may be constructed as a sun and planet gear arrangement. A plurality of planet gears 1117, 1119 may interface with the collecting spindle 1130 and additional gears 1121. The sun and planet arrangement may provide a different gear ratio between the collecting spindle 1130 and the rotation of the gear teeth 1170 of the thumbwheel 1120. By using the planet gear arrangement, less rotation force is needed to move the collecting spindle 1130 and advance new floss. Other features and functionality provided by the dental flosser 1100 may be similar to the dental flosser 1000. FIG. 15 illustrates the gear having gear teeth 1106 for the dispensing spindle 1128 that are not illustrated in FIG. 14, as described above.

Figure 16:
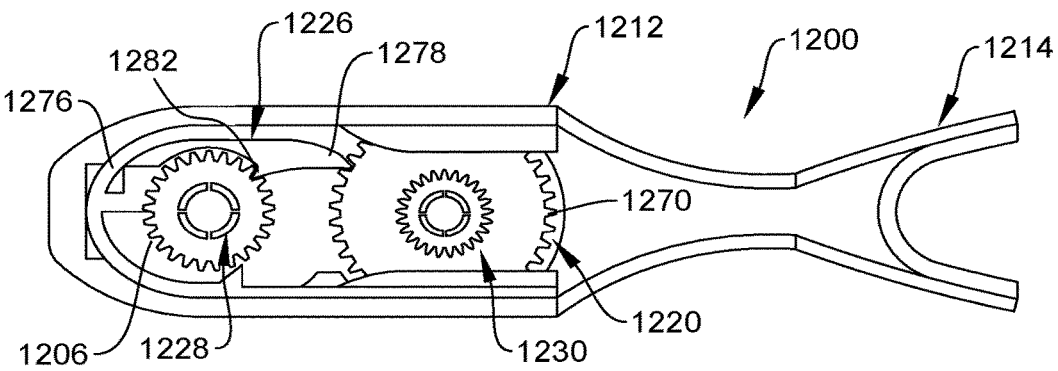
FIG. 16 is a top view of a portion of another example dental flosser in accordance with the present disclosure.

FIG. 16 illustrates a dental flosser 1200 that includes a handle 1212, a floss support 1214, a thumbwheel 1220, a brake 1226, and dispensing and collecting spindles 1228, 1230. The thumbwheel 1220 includes gear teeth 1270. The dispensing spindle 1228 includes gear teeth 1206. The brake 1226 includes a thumbwheel arm 1278, a dispensing spool arm 1282, and a handle connector 1276. The handle connector 1276 is connected to the handle 1212 at an end thereof adjacent to, for example, the hinge point for the cover. Applying a rotation force to the thumbwheel 1220 moves the thumbwheel arm 1278 out of engagement with the gear teeth 1270 and dispensing spool arm 1282 out of engagement with the gear teeth 1206. The brake 1226 has inherent bias provided therein due in part to its length, shape, and size such that removing the rotation force to the thumbwheel 1220 causes the thumbwheel arm 1278 to reengage with the gear teeth 1270 and the dispensing spool arm 1282 to reengage the gear teeth 1206. In some arrangements, the brake 1226 may include multiple dispensing spool arms 1282, or at least multiple features that engage with the gear teeth 1206 around a perimeter of the gear of the dispensing spindle 1228.

Figure 17:
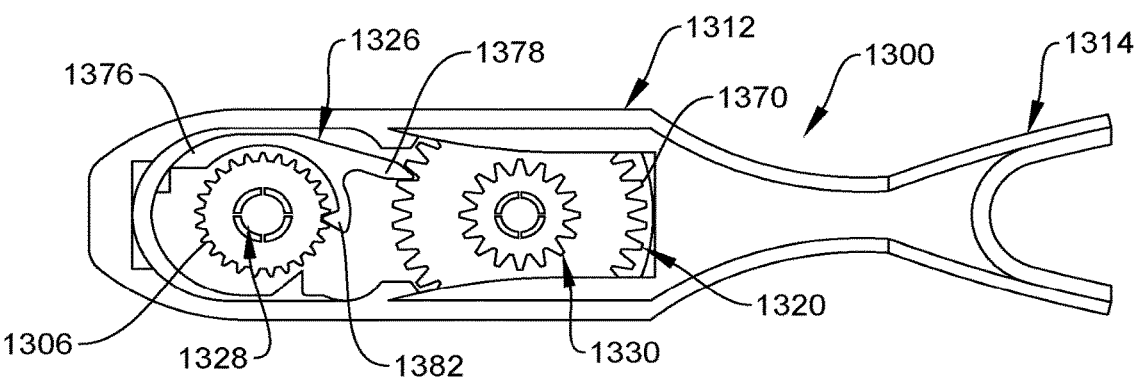
FIG. 17 is a top view of a portion of another example dental flosser in accordance with the present disclosure.

FIG. 17 illustrates a dental flosser 1300 that includes a handle 1312, a floss support 1314, a thumbwheel 1320, a brake 1326, and dispensing and collecting spindles 1328, 1330. The thumbwheel 1320 includes gear teeth 1370. The dispensing spindle 1328 includes gear teeth 1306. The brake 1326 includes thumbwheel and dispensing spool arms 1378, 1382, and a handle connector 1376. The brake 1326 has a shape that clearly defines the arms 1378, 1382 and positions their connection point with respective gear teeth 1370, 1306 at relative rotation angles to each other in the range of about 40 to about 80 degrees. The handle connector 1376 is connected to the handle 1312 at a location at a rear end of the handle 1312 such that the brake 1326 extends around a perimeter of the gear 1306 of the dispensing spindle 1328. The shape, size and construction of the brake 1326 provides a biasing force that automatically moves the arms 1378, 1382 back into engagement with respective gear teeth upon releasing a rotation force to the thumbwheel 1320 during take-up of the floss 24.

Figure 18:
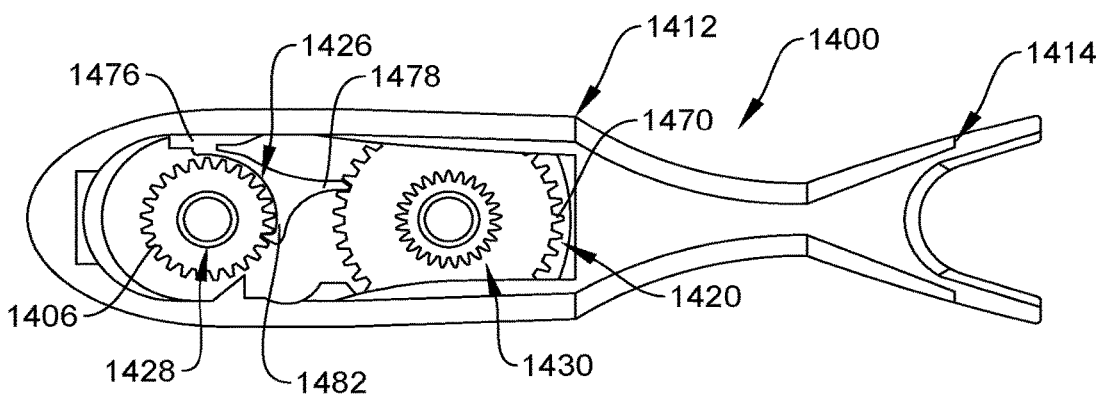
FIG. 18 is a top view of a portion of another example dental flosser in accordance with the present disclosure.

FIG. 18 illustrates a dental flosser 1400 that includes a handle 1412, a floss support 1414, a thumbwheel 1420, a brake 1426, and dispensing and collecting spindles 1428, 1430. The thumbwheel 1420 includes gear teeth 1470. The dispensing spindle 1428 includes gear teeth 1406. The brake 1426 includes thumbwheel and dispensing spool arms 1478, 1482 and a handle connector 1476. The handle connector 1476 is mounted to the handle 1412 along a side thereof spaced away from the end of the handle 1412. The brake 1426 is configured such that a portion thereof extends around a perimeter of the gear of the dispensing spindle 1428. The brake 1426 includes distinctive thumbwheel and dispensing spool arms 1478, 1482 that engage respective gear teeth 1470, 1406 at relative angles from each other in a range of about 40 degrees to about 80 degrees. A brake 1426 is shaped in size to provide a biasing force that moves the thumbwheel and dispensing spool arms 1478, 1482 into engagement with respective gear teeth 1470, 1406 upon removal of a rotation force to the thumbwheel 1420 during take-up of used floss.

Figure 19:
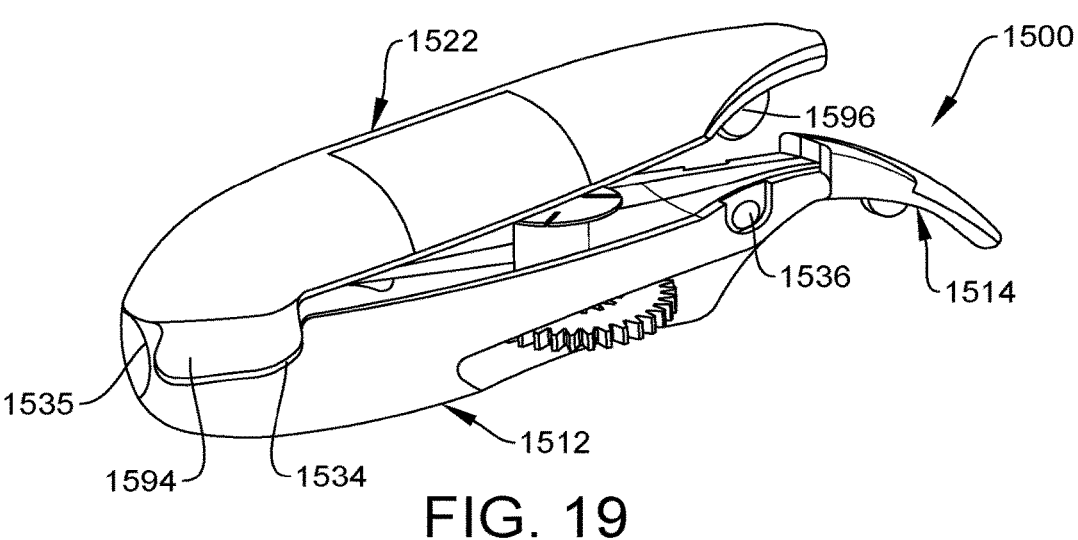
FIG. 19 is a rear perspective view of another example dental flosser in accordance with the present disclosure.

FIG. 19 illustrates a dental flosser 1500 that includes a handle 1512, a floss support 1514, and a cover 1522. The cover 1522 is pivotally connected to the handle 1512 at an interface between a cover attachment recess 1534 of the handle 1512 and a hinge member 1594 of the cover 1522. The hinge member 1594 is arranged primarily on an outside of the handle 1512 and/or is exposed along an outer surface of the handle 1512. The cover attachment recess 1534 may include first and second cover attachment recesses 1534 positioned on opposing sides of the handle 1512 with a cover attachment member 1535 defined therebetween. One of the cover attachment member 1535 and hinge member 1594 may include one or more connecting features that provide the pivotal movement therebetween that permits the cover 1522 to pivot between the open position shown in FIG. 19 and a closed position (not shown).

The handle 1512 further includes one or more latch grooves 1536 sized and arranged to interface with one or more latch members 1596 of the cover 1522. The latch grooves 1536 are exposed along an outer surface of the handle 1512 as compared to being positioned along an inner surface included in the handle 12 described above with reference to FIGS. 1-5. The latch members 1596 may provide a snap-lock connection between the handle 1512 and cover 1522.

Figure 20:
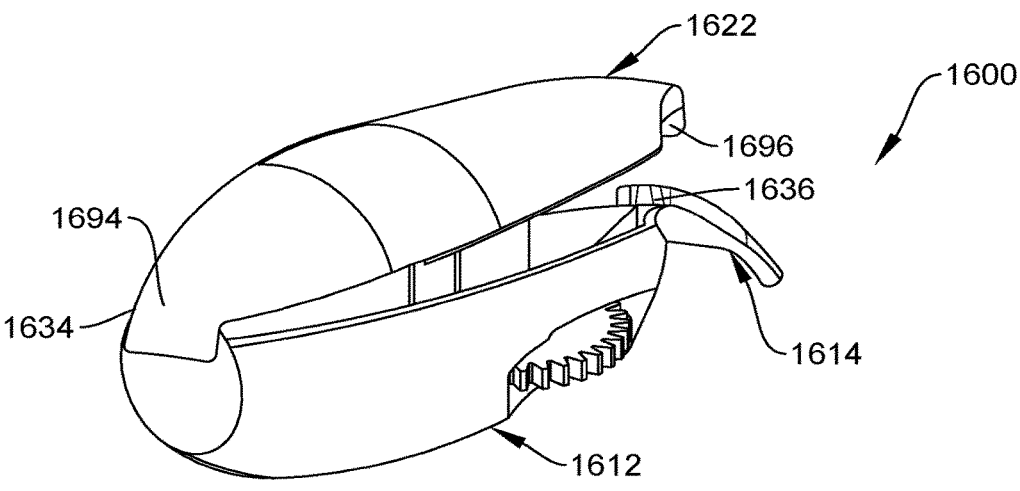
FIG. 20 is a rear perspective view of another example dental flosser in accordance with the present disclosure.

FIG. 20 shows another example of a dental flosser 1600 that includes a handle 1612, a floss support 1614, and a cover 1622. The handle 1612 includes a cover attachment recess 1634 that receives a hinge member 1694 of the cover 1622. The interface between the cover attachment recess 1634 and the hinge member 1694 provides a pivotal connection that permits the cover 1622 to pivot between the open position shown in FIG. 20 and a closed position (not shown).

The handle 1612 may also include one or more latch grooves 1636 receptive of one or more latch member 1696 of the cover 1622. The latch grooves 1636 are arranged centrally along a center line of the dental flosser 1600 and may be aligned with the hinge member 1694. The latch member 1696 may provide a snap-fit connection between the handle 1612 and cover 1622.

FIGS. 19 and 20 illustrate a few of the many different configurations possible for connecting a handle of the dental flosser to the cover of the dental flosser with a pivot connection and a releasable closure device (e.g., snap-fit connection). Many other configurations are possible, including configurations in which the cover is fully separable from the handle rather than being pivotally connected to provide improved access to the internal cavity and related internal components of the dental flosser. In other examples, the cover may be permanently connected to the handle. The cover may have a configuration that is intended to be disposable, such as one in which it is not possible to replace the dispensing spool with additional floss or re-spool the floss in the event of the floss breaking. Examples of permanent connections involve, for example, adhesive bonds, heat welds, and non-releasable snap-fit connections.

Figure 21:
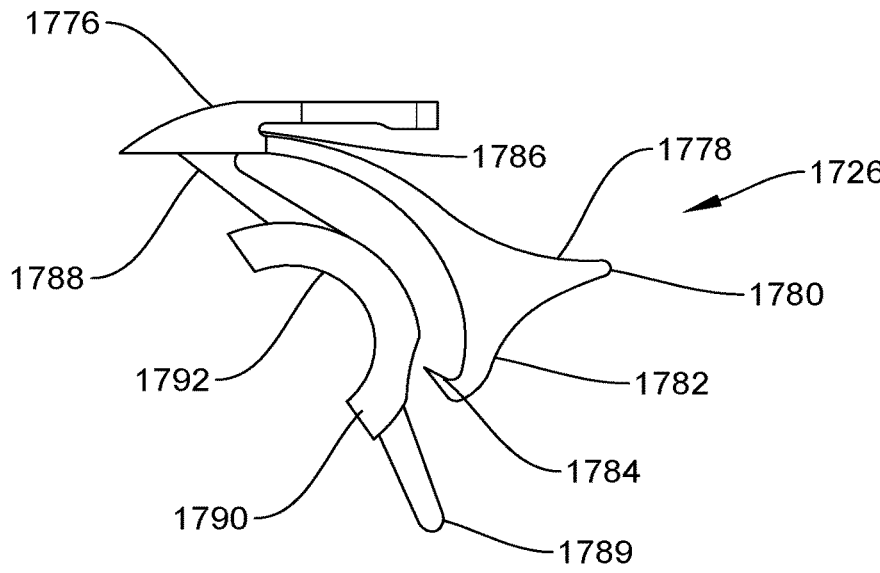
FIG. 21 is a top view of another example brake for use in the dental flossers disclosed herein.

FIG. 21 shows another example brake 1726 for use in the dental flossers disclosed herein. The brake 1726 includes a handle connector 1776, a thumbwheel arm 1778 having a tip 1780, a dispensing spool arm 1782 having a tip 1784, a hinge 1786, a brake pad arm 1788, and a brake pad 1790 having a spindle surface 1792. The handle connector 1776 is arranged and sized to fit in the brake recess of a handle of the dental flosser (e.g., handle 12 of dental flosser 10). The brake pad 1790 may have a second brake pad arm 1789 to contact or connect to an opposite side of the handle (e.g., handle 12 of dental flosser 10). The second brake pad arm 1789 may provide improved stability and reduced movement of the brake pad 1790 during use. It can also be used to provide a preset amount of friction or resistance to the rotation of the dispensing spool 28. In at least some examples, the second brake pad arm 1789 may extend out of the housing and arranged to be manually contacted by a user to apply a braking force to the spindle.

Figure 22:
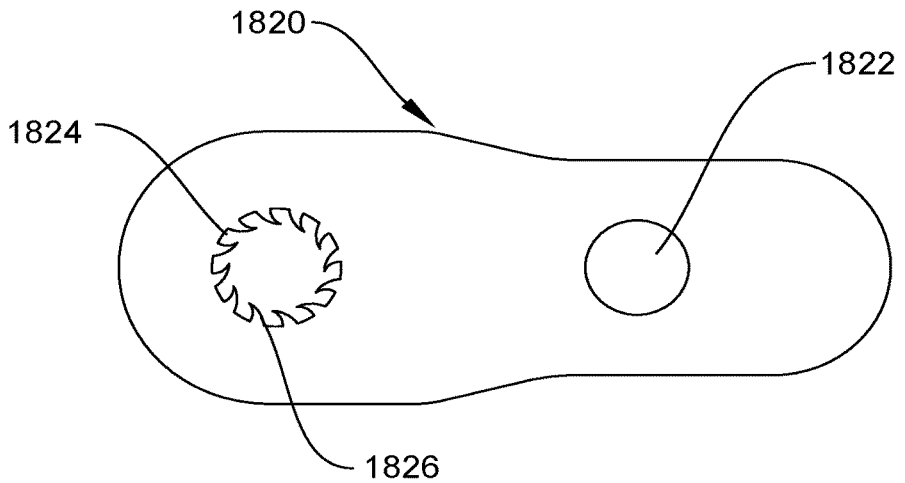
FIG. 22 is a top view of another example barrier member for use in the dental flossers disclosed herein, the barrier member having a friction feature.
Figure 23:
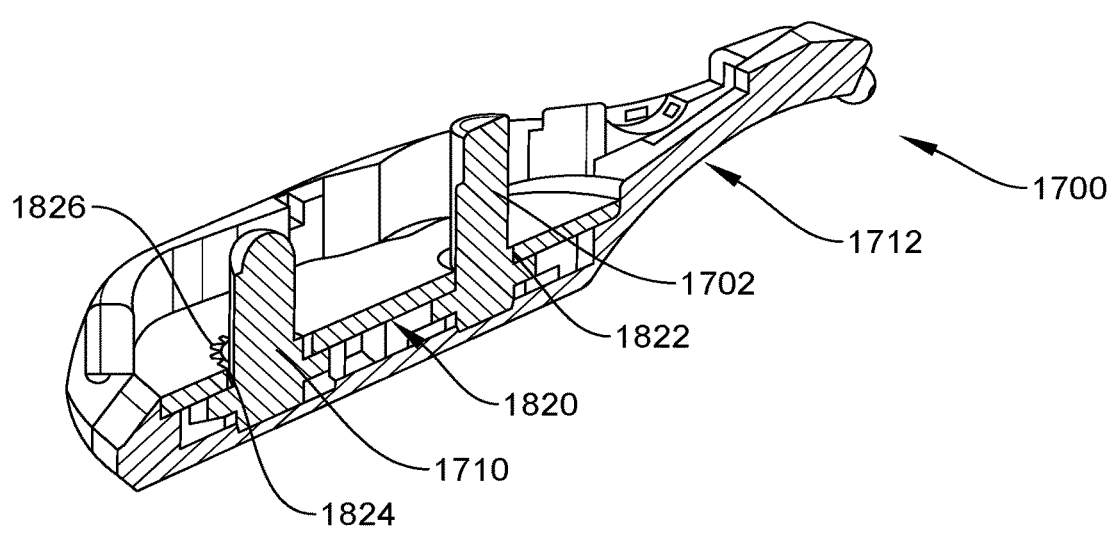
FIG. 23 is a perspective cross-sectional view of a dental flosser having the barrier member of FIG. 22.

FIG. 22 shows an alternative barrier member 1820 (also referred to as a floor or plate of the dental flosser). The barrier member 1820 may be positioned within the housing (e.g., the handle 1712 and cover of dental flosser 1700 shown in FIG. 23) between the dispensing and collecting spools and the area in the housing where the thumbwheel and gears are located. The barrier member 1820 may include openings 1822, 1824 through which the hubs 1702, 1710 extend. See FIG. 23. The barrier member 1820 may include friction members 1826 exposed within one or both openings 1822, 1824. The friction members 1826 shown in FIGS. 22 and 23 are configured as teeth that extending into the opening 1822. The friction members 1826 may be rigid or flexible. The friction members 1826 may be pointed in one circumferential direction, such as a direction that would provide increased friction for rotation of the hub 1710 in a particular direction, such as a direction that would permit undesired unwinding of the dispensing or unwind spool attached to the hub 1710. The amount of friction can be controlled by changing, for example, the number, size, orientation, materials, shape, and/or other properties of the friction members 1826.

Figure 24:
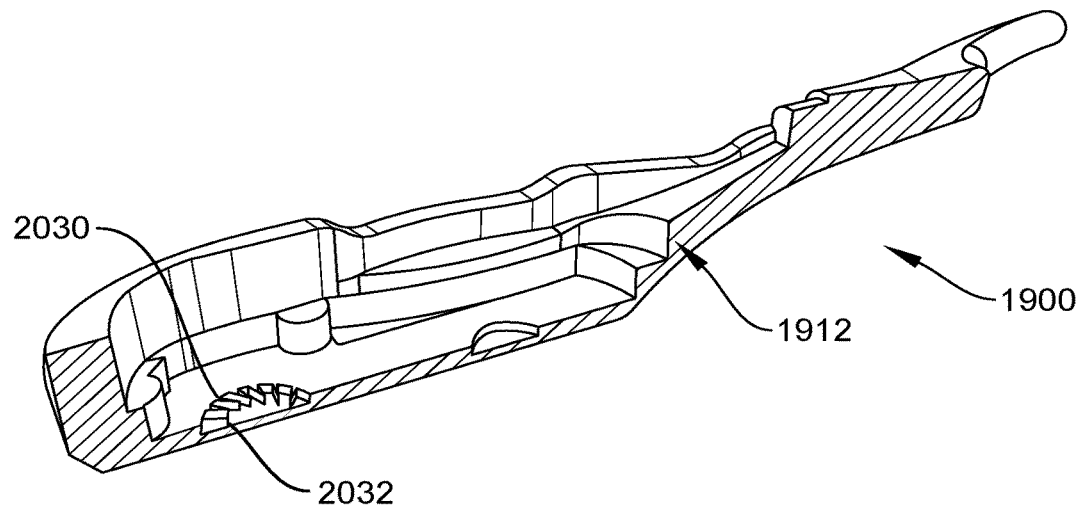
FIG. 24 is a perspective cross-sectional view of a handle of a dental flosser, the handle having a friction feature integrated into a spindle seat that receives a spindle for the unwind spool of the dental flosser.

FIG. 24 is a perspective cross-sectional view of a handle 1912 of a dental flosser 1900. The handle 1912 has at least one friction member 2032 (e.g., a plurality of friction members 2032) integrated into a spindle seat 2030. The spindle seat 2030 receives a spindle for the dispensing spool of the dental flosser 1900. The friction member 2032 may be the same or similar to the friction members 1826 described in FIGS. 22 and 23.

Figure 25:
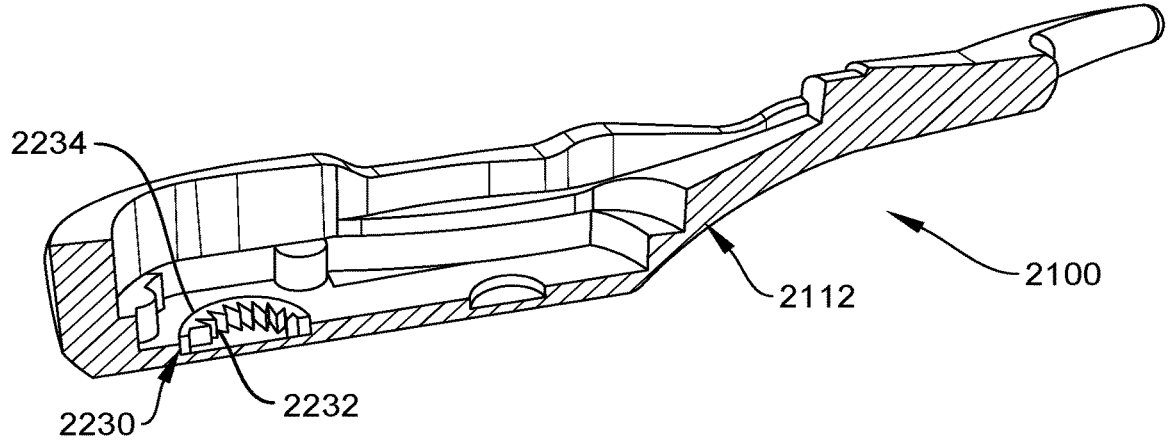
FIG. 25 is a perspective cross-sectional view of a handle of a dental flosser, the handle having a friction feature integrated into a bushing arranged in a spindle seat of the handle, the bushing and spindle seat to receive a spindle for the unwind spool of the dental flosser.
Figure 26:
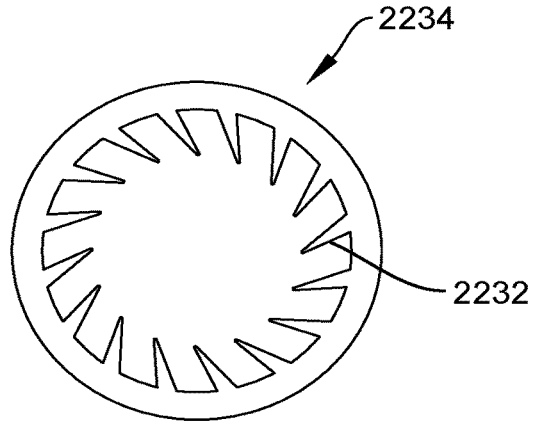
FIG. 26 is a top view of the bushing with friction feature shown in FIG. 25.

FIG. 25 is a perspective cross-sectional view of a handle 2112 of a dental flosser 2100. The handle 2112 has a bushing 2234 mounted within a spindle seat 2230. The bushing 2234 includes at least one friction member 2232 (e.g., a plurality of friction members 2232). The bushing 2234 receives a spindle for the dispensing spool of the dental flosser 2100. The friction member 2232 may be the same or similar to the friction members 1826, 2032 described above with reference to FIGS. 22-24. FIG. 26 is a top view of the bushing 2234 with friction members 2232.

Figure 27:
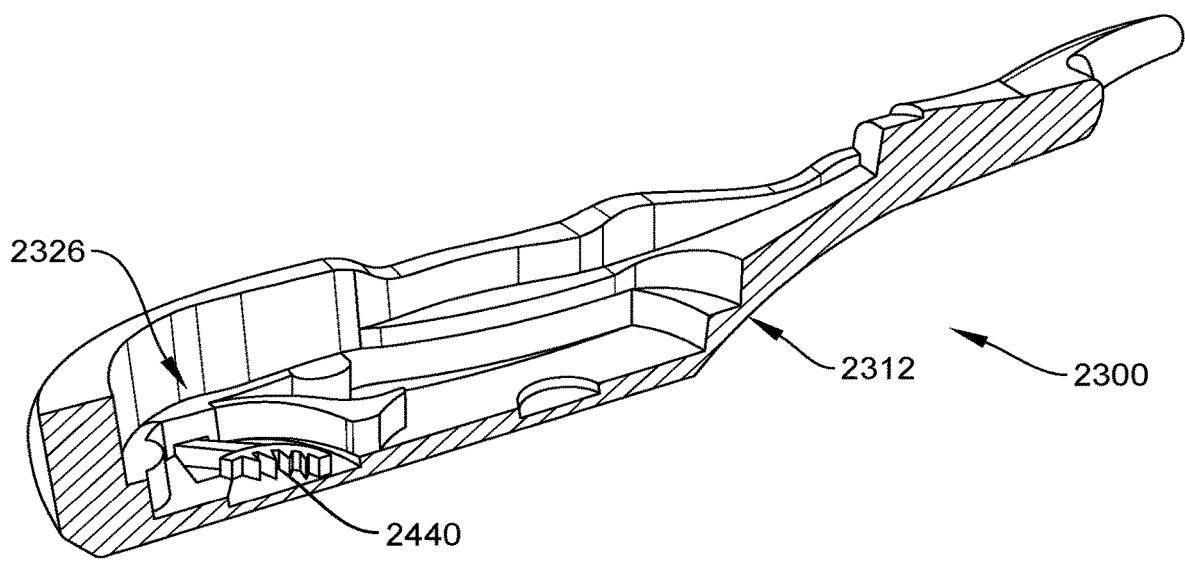
FIG. 27 is a perspective cross-sectional view of a handle of a dental flosser with a brake mounted therein, the brake having a friction feature that engages a spindle for the unwind spool of the dental flosser.
Figure 28:
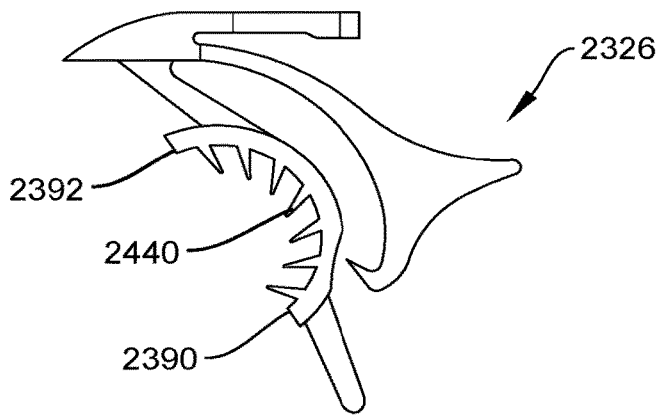
FIG. 28 is a top view of the brake shown in FIG. 27.

FIG. 27 is a perspective cross-sectional view of a handle 2312 of a dental flosser 2300 with a brake 2326 mounted therein. The brake 2326 has at least one friction member 2440 that engages a spindle for the dispensing spool of the dental flosser 2300. The friction members 2440 may be arranged on a spindle surface 2392 of a brake pad 2390 of the brake 2326. The friction members 2440 may be the same or similar to the friction members 1826, 2032, 2232 described above. FIG. 28 is a top view of the brake shown in FIG. 27.

FIG. 29 is a flowchart illustrating an example method 2500 for operating a dental flosser in accordance with the present disclosure. The method 2500 may apply to any of the embodiments disclosed herein. The method 2500 includes, at block 2502, providing a dental flosser having a handle, a dental floss support defining first and second tops, a floss dispensing spool, a floss collection spool, a thumbwheel, and a spool brake. Block 2504 includes rotating the collecting spool with the thumbwheel to uptake floss from the dispensing spool, across the first and second tips, and onto the collecting spool. Block 2506 includes fixing rotated positions of the dispensing and collecting spools with the spool brake when the collecting spool is not rotated, the spool brake automatically releasing dispensing and collecting spools to rotate upon operating the thumbwheel.

The method 2500 may also include providing the spool brake with first and second arms arranged to engage the collecting and dispensing spools, respectively, to fix the rotated positions. The thumbwheel may be arranged coaxially with the collecting spool, the thumbwheel may include a plurality of gear teeth for engagement by the first arm of the spool brake, the dental flosser may further include a dispensing gear arranged coaxially with the dispensing spool and having a plurality of gear teeth for engagement by the second arm of the spool brake. Application of a tension force to the floss may increase contact forces between the spool brake and the dispensing and collecting spools. The housing may include a base and a cover, the cover may be pivotally connected to a rear end of the housing at a location opposite a front end where the first and second tips are located, and the cover may be releasably held in a closed position by at least one snap feature positioned along a side of the base between the rear and front ends.

Figure 33:
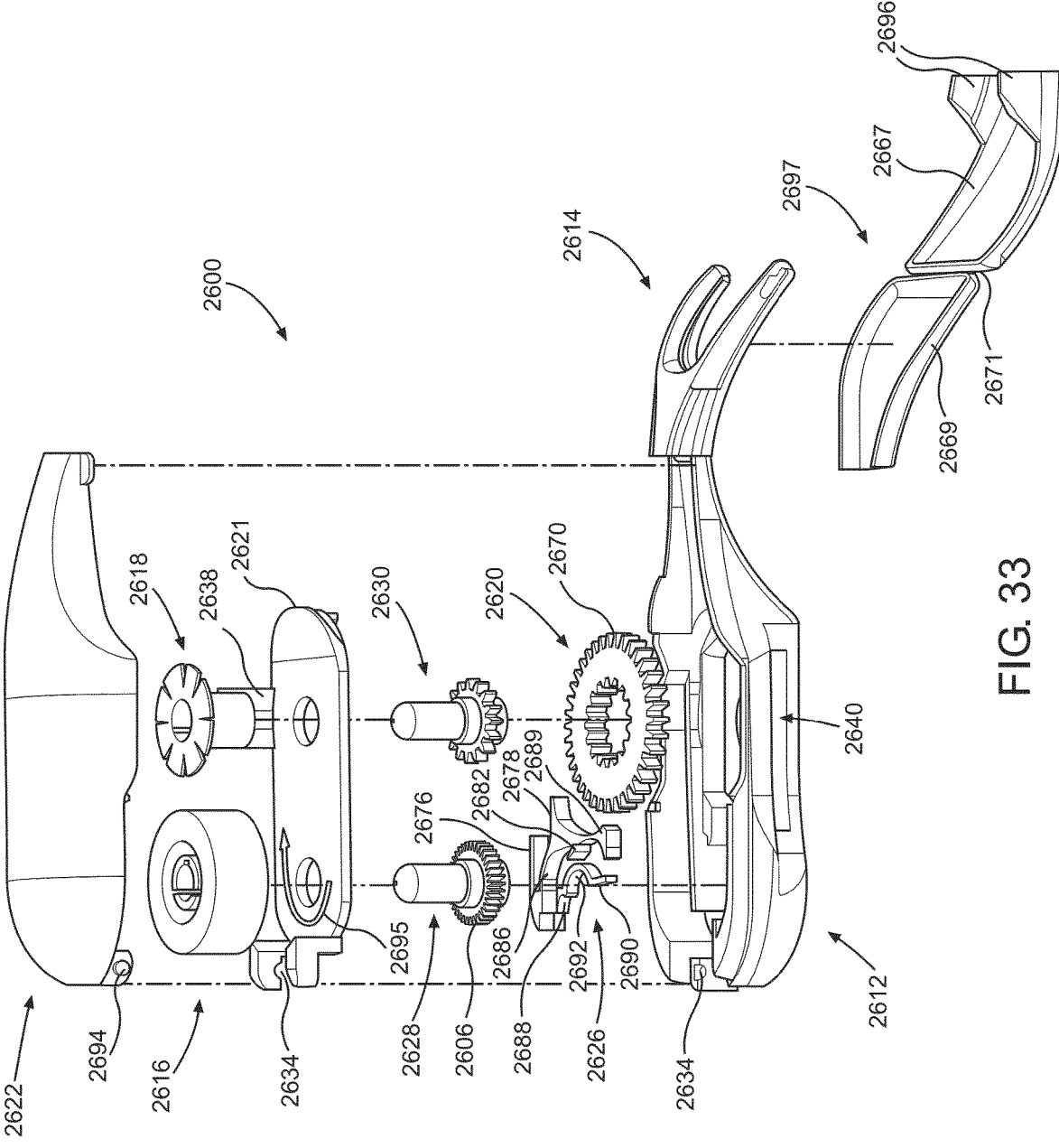
FIG. 33 is an exploded, perspective view of the dental flosser in FIGS. 30-31.

FIGS. 30-33 show another embodiment of a dental flosser 2600 including a handle 2612 with a cover 2622 pivotably coupled to the handle 2612. The combination of the handle 2612 and the cover 2622 form a housing for the dental flosser 2600. FIGS. 30-31 are perspective views of the dental flosser 2600 in an assembled state. FIG. 32 is a cross-sectional view of the assembled dental flosser 2600 that illustrates the operation of certain internal components as described below. FIG. 33 is an exploded view of the dental flosser 2600.

As shown in FIG. 33, the dental flosser 2600 includes a floss support 2614, a dispensing spool 2616, a collecting spool 2618, a thumbwheel 2620, a brake 2626, a dispensing spindle 2628 and a collecting spindle 2630. The thumbwheel 2620 includes gear teeth 2670, and the dispensing spindle 2628 includes gear teeth 2006. The brake 2626 includes a handle connector 2676, a thumbwheel arm 2678, a dispensing spool arm 2682, a hinge 2686, and a brake pad having brake pad arms 2688, 2690, and a spindle surface 2692. The handle connector 2676 is arranged and sized to fit in a brake recess 2642 in the handle 2612. The brake 2626 shares a number of similarities with the brake 1726 shown in FIG. 21 as well as other embodiments of the brake. It should be appreciated that the description of any corresponding structure applies equally to the brake 2626 such as, for example, the configuration and operation of the brake pads 1790.

The brake 2626 also includes a release arm 2689 (alternatively referred to as a handle arm or actuator arm) extending out of the housing formed by the handle 2612 and the cover 2622 and arranged to be manually contacted by a user to move the brake 2626 between an engaged position and a disengaged position. There are a number of reasons it may be desirable to manually engage and disengage the brake 2626. For example, the floss may get stuck in the user's teeth and the user may need to disengage the brake 2626 to remove the floss or even cut the floss.

It should be appreciated that the release arm 2689 can have a variety of configurations that allow the user to manually move the brake 2626 as desired. For example, in one embodiment, the release arm 2689 can extend through a portion of the same slot or opening 2640 through which the thumbwheel 2620 extends. In this embodiment, the slot 2640 is enlarged to allow room for the release arm 2689 to extend out of the housing adjacent to the thumbwheel 2620. One advantage of this configuration is that the user can operate the thumbwheel 2620 and the release arm 2689 with the same thumb or finger. In another embodiment, the release arm 2689 can extend through a slot or opening that is separate from the slot 2640.

The operation of the brake 2626 is illustrated in FIG. 32. The release arm 2689 can move between a first position where the spindles 2628, 2630 are locked in position and a second position where the spindles 2628, 2630 can rotate to allow the dental floss 24 to advance through the dental flosser 2600. In the first position, the thumbwheel arm 2678 and the dispensing spool arm 2682 engage the gear teeth 2670 on the thumbwheel 2620 and the gear teeth 2606 on the dispensing spindle 2628, respectively. In this position, the brake 2626 prevents movement of the thumbwheel 2620 and the dispensing spindle 2628 thereby keeping the floss 24 taught in the floss support 2614. The user can manually move the release arm 2689 to the second position by pushing the release arm 2689 towards the thumbwheel 2620. This moves the thumbwheel arm 2678 and the dispensing spool arm 2682 out of engagement with the gear teeth 2670, 2606 thereby allowing the spindles 2628, 2630 to rotate and floss 24 to advance through the floss support 2614.

The dental flosser 2600 includes a barrier member 2621 configured to interface with the hinge member 2694 that provides a pivotal connection between the handle 2612 and the cover 2622. The barrier member 2621 and the handle 2612 include attachment recesses 2634 sized and positioned to receive the hinge members 2694. In this way, the barrier member 2621 can be used to securely hold the handle 2612 and the cover 2622 together. The barrier member 2621 can also include a graphical indicator 2695 showing the correct orientation of the dispensing spool 2616. For example, the graphical indicator 2695 can be an arrow showing the direction the floss 24 should wrap around the dispensing spool 2616.

The barrier member 2621 also includes a floss guide 2638 extending upward into the cavity. The floss guide 2638 can be used to separate the floss 24 on the dispensing spool 2616 from the floss 24 on the collecting spool 2618 as they move through the dental flosser 2600. The floss guide 2638 can also be configured to provide additional tension to the floss 24 by compressing the floss 24 between the floss guide 2638 and the handle 2612.

The dental flosser 2600 can also include a cover 2697 configured to fit over all or a portion of the floss support 2614 and protect the dental floss 24 when the dental flosser 2600 is not being used. In one embodiment, the cover 2697 includes a top portion 2667 pivotably coupled to a bottom portion 2669 with a hinge 2671. The hinge 2671 can be formed of any suitable material or device. In some embodiments, the hinge 2671 can be a living hinge formed of a pliable polymeric material such as a polyolefin, for example, polypropylene. In other embodiments, the hinge 2671 can be a mechanical hinge formed by concentric rings pivoting around a central shaft.

In some embodiments, the cover 2697 can have a clamshell design that allows the top portion 2667 and the bottom portion 2669 to enclose the tips of the floss support 2614 and prevent access to the dental floss 24. The cover 2697 can be coupled to the floss support 2614 using latch members 2696 on the top portion 2667. The latch members 2696 fit over the floss support 2614 and hold the cover 2697 to the handle 2612.

Figure 34:
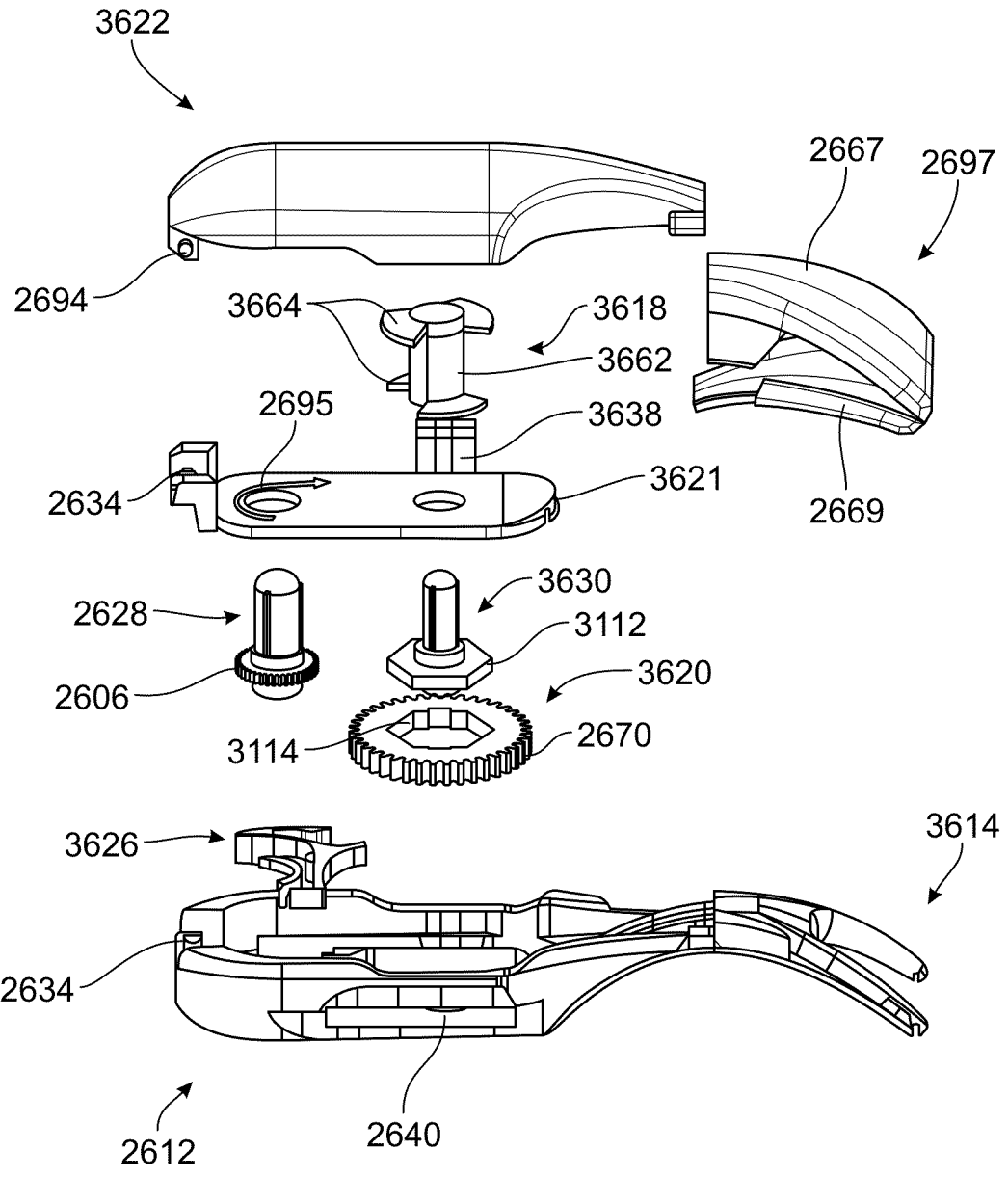
FIGS. 34-35 are exploded, perspective views of the front and the back of another embodiment of a dental flosser.
Figure 35:
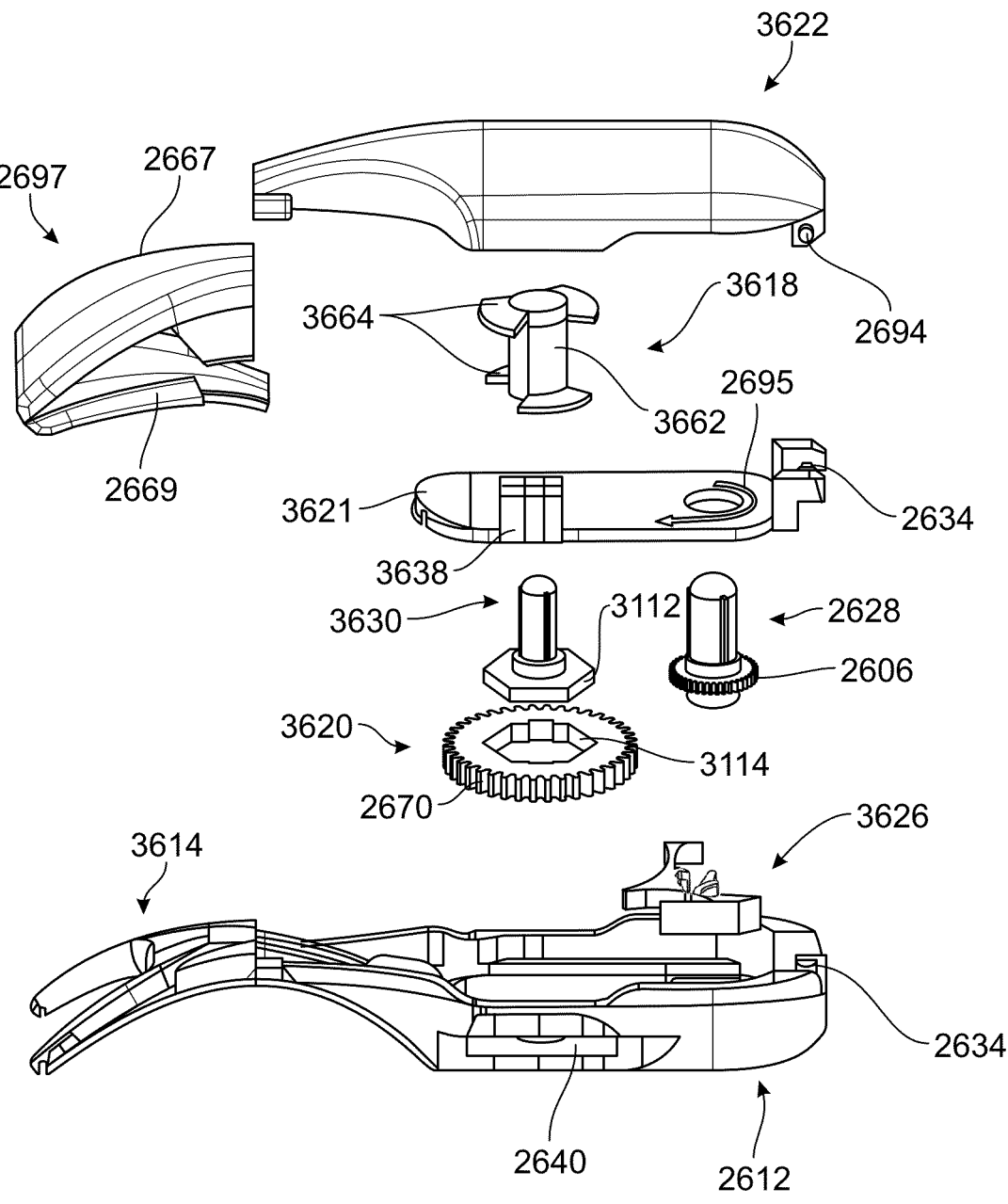

FIGS. 34-35 show front and rear perspective views of another embodiment of a dental flosser 3622. The dental flosser 3622 is similar in many ways to the dental flosser 2622. Accordingly, the description of the dental flosser 2622 applies equally to the dental flosser 3622 unless noted otherwise in the following.

The dental flosser 3622 includes a collecting spool 3618, a collecting spindle 3630, and a thumbwheel 3620 that are different than the corresponding components of the dental flosser 2622. For example, the thumbwheel 3620 and the collecting spindle 3630 are rotationally linked using a hexagonal shaped gear and bore arrangement. A hexagonal shaped gear 3112 on the collecting spindle 3630 is sized to be received by a correspondingly shaped hexagonal bore 3114 in the thumbwheel 3620. It should be appreciated that the gear and bore can have any suitable geometric shape (triangular, square, rectangular, pentagonal, etc.) as long as it is capable of rotationally linking the components together.

The dental flosser 3622 also includes a collecting spool 3618 having a hub 3662 and upper and lower edges or bases 3664. This configuration is advantageous because it prevents the floss from coming off of the collecting spool 3618 as it is wound on the collecting spool 3618. For example, the collecting spool 18 may allow floss to become wedged between the bottom of the hub 62 and the barrier member 120 as it is wound on the collecting spool 18. The floss may push upward on the collecting spool 18 and potentially cause problems with the operation of the dental flosser. The configuration of the collecting spool 3618 solves this problem and prevents this from happening by preventing the floss from coming off the bottom of the collecting spool 3618.

Figure 36:
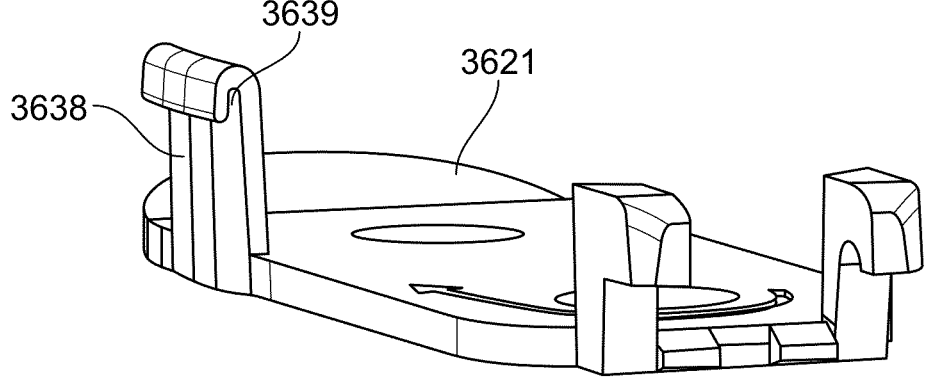
FIG. 36 is a perspective view of one embodiment of a barrier member used with the dental flosser in FIGS. 34-35.

The dental flosser 3622 also includes a barrier member 3621 having a floss guide 3638 that includes a hook or channel 3639 that prevents the floss from riding up too high on the floss guide 3638. If the floss rides up too high on the floss guide 3638 it enters the recess or channel formed by the hook 3639, which prevents it from traveling over the top of the floss guide 3638. The configuration of the barrier member 3621 and the floss guide 3638 is shown in greater detail in FIG. 36.

Figure 37:
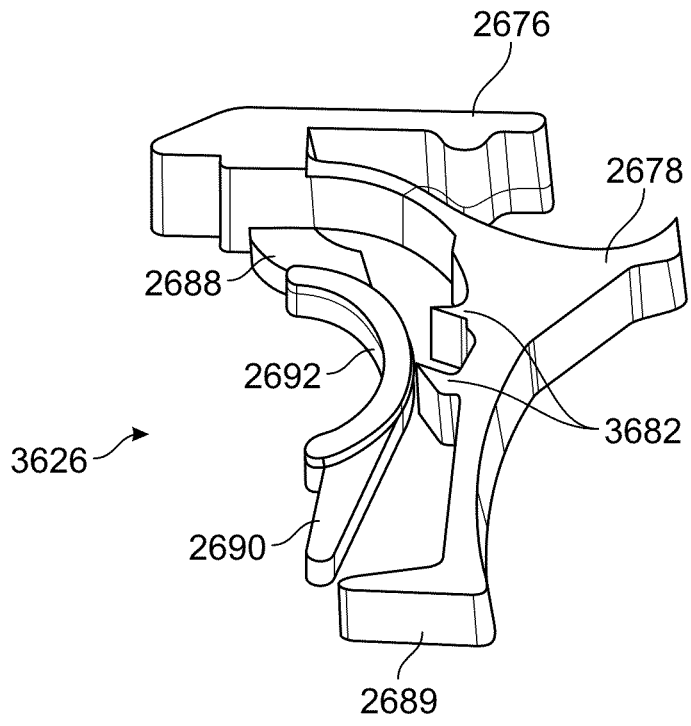
FIG. 37 is a perspective view of one embodiment of a brake used with the dental flosser in FIGS. 34-35.

Referring to FIG. 37, the dental flosser 3622 includes a brake 3626 that is slightly different than the brake 2626 described in connection with the dental flosser 2622. It should be appreciated that the brake 3626 includes the brake pad having brake pad arms 2688, 2690 and spindle surface 2692. Likewise, in both designs, the brake pad arm 2688 is fixed to the handle connector 2676 and the brake pad arm 2690 contacts the interior of the housing of the dental flosser 2622, 3622 (e.g., the brake pad arm 2690 can be received by a recess in the housing) to provide a preset amount of friction on the dispensing spindle 2628 and thereby resist rotation of the dispensing spindle 2628. In this way, the correct amount of tension is applied to the hub of the dispensing spindle 2628 without any user interaction.

The brake 3626 differs from the brake 2626 in that the brake 3626 includes multiple dispensing spool arms 3682. The dispensing spool arms 3682 operate in a similar manner to the dispensing spool arm 2682 in that they engage the gear teeth 2606 on the dispensing spindle 2628.

Figure 38:
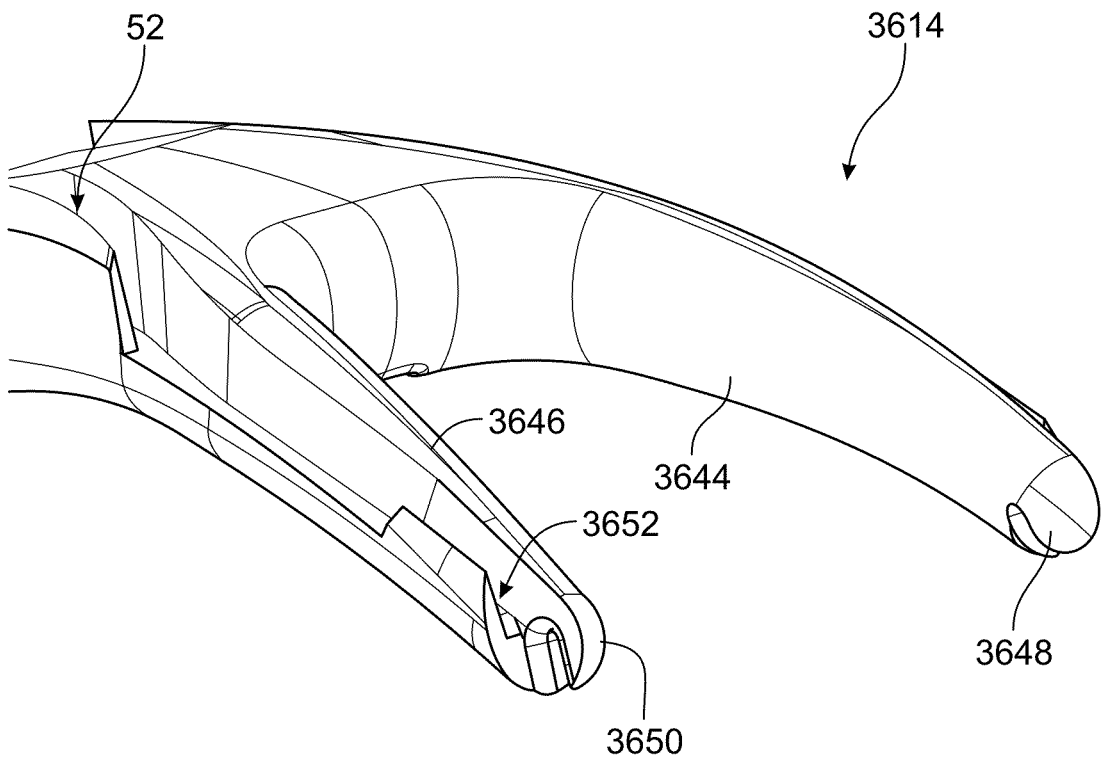
FIG. 38 is a perspective view of a floss support from the dental flosser shown in FIGS. 34-35.

Referring to FIG. 38, the dental flosser 3622 includes a floss support 3614 that has first and second arms 3644, 3648 and first and second tips 3648, 3650, respectively. The arms 3644, 3648 include tracks or channels 3652 extending lengthwise relative to the arms 3644, 3648 and sized to receive the floss and hold it in place. The floss also extends through slots 3652, 3654 in the ends of the tips 3648, 3650. The size, position, and shape of the tracks 3652 and the slots 3652, 3654 help to hold the floss in place at the end of the floss support 3614 as the user moves the floss up and down between the teeth.

ILLUSTRATIVE EMBODIMENTS

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A dental flosser, comprising: a handle; a dental floss support mounted to the handle and having first and second projections, each projection defining a tip; a floss dispensing spool mounted to the handle; a floss collecting spool mounted to the handle; a thumbwheel operable to rotate the collecting spool to cause uptake of floss from the dispensing spool, across the tips of the first and second projections, and onto the collecting spool; and a spool brake member mounted to the handle and operable to fix rotated positions of the dispensing and collecting spools, and to automatically release the dispensing spool to rotate upon rotating the thumbwheel.

P2. The dental flosser of paragraph P1 wherein the thumbwheel projects from the handle, and rotation of the thumbwheel initiates rotation of the collecting spool.

P3. The dental flosser of paragraph P2 wherein the thumbwheel projects from opposite sides of the handle.

P4. The dental flosser of any one of paragraphs P1-P3 further comprising a dispensing gear mounted to the housing coaxially with the dispensing spool, and a collecting gear mounted to the housing coaxially with the collecting spool, the spool brake member operable to engage the dispensing and collecting gears to control rotation of the dispensing and collecting spools.

P5. The dental flosser of paragraph P4 wherein the dispensing gear includes gear teeth with a different size than gear teeth of the collecting gear.

P6. The dental flosser of paragraph P5 wherein the gear teeth of the collecting gear are larger than the gear teeth of the dispensing gear.

P7. The dental flosser of any one of paragraphs P5-P6 wherein the collecting gear has a larger diameter than a diameter of the dispensing gear.

P8. The dental flosser of paragraph P7 wherein the thumbwheel defines the collecting gear.

P9. The dental flosser of any one of paragraphs P1-P8 further comprising at least one floss tensioner positioned in the housing and operable to contact the floss to provide resistance to dispensing of the floss.

P10. The dental flosser of any one of paragraphs P1-P9 further comprising a spool tensioner operable to apply a compression force on a rotation spindle of the dispensing spool when the spool brake fixes rotated positions of the dispensing and collecting spools.

P11. The dental flosser of any one of paragraphs P1-P10 further comprising a friction member in contact with the dispensing spool to resist rotation of the dispensing spool, the friction member including at least one tooth member.

P12. A dental flosser, comprising: a handle; a dental floss support mounted to the handle and having first and second projections, each projection defining a tip; a floss dispensing spindle rotatably mounted to the handle; a floss collecting spindle rotatably mounted to the handle; a thumbwheel mounted to the collecting spindle to rotate the collecting spindle to cause uptake of floss from the dispensing spindle, across the tips of the first and second projections, and onto the collecting spindle, the thumbwheel having a plurality of gear teeth; a dispensing gear mounted coaxially with the dispensing spindle, the dispensing gear having a plurality of gear teeth; and a brake member mounted to the handle and operable to engage the gear teeth of the thumbwheel and dispensing gear to fix rotated positions of the dispensing and collecting spindles, and to automatically release the dispensing spindles to rotate upon rotating the thumbwheel.

P13. The dental flosser of paragraph P12 wherein the dispensing gear is formed integral with the dispensing spindle.

P14. The dental flosser of any one of paragraphs P12-P13 further comprising a collecting gear mounted coaxially with the collecting spindle, the thumbwheel being mounted to the collecting gear.

P15. The dental flosser of paragraph P14 wherein the collecting gear is formed integral with the collecting spindle.

P16. The dental flosser of any one of paragraphs P12-P15 wherein the brake member includes a first arm with arranged to engage the gear teeth of the thumbwheel, and a second arm arranged to engage the gear teeth of the dispensing gear.

P17. A method of operating a dental flosser, comprising: providing the dental flosser with a handle, a dental floss support defining first and second tips, a floss dispensing spool, a floss collecting spool, a thumbwheel, and a spool brake; rotating the collecting spool with the thumbwheel to uptake floss from the dispensing spool, across the first and second tips, and onto the collecting spool; fixing rotated positions of the dispensing and collecting spools with the spool brake when the thumbwheel is stationary, the spool brake automatically releasing the dispensing spool to rotate upon rotating the thumbwheel.

P18. The method of paragraph P17 wherein the spool brake includes first and second arms arranged to engage the collecting and dispensing spools, respectively, to fix the rotated positions.

P19. The method of paragraph P18 wherein the thumbwheel is arranged coaxially with the collecting spool, the thumbwheel including a plurality of gear teeth for engagement by the first arm of the spool brake, the dental flosser further comprising a dispensing gear arranged coaxially with the dispensing spool and including a plurality of gear teeth for engagement by the second arm of the spool brake.

P20. The method of any one of paragraphs P17-P19 wherein application of a tension force to the floss increases contact forces between the spool brake and the dispensing and collecting spools.

P21. The method of any one of paragraphs P17-P19 wherein the housing includes a base and a cover, the cover being pivotally connected to a rear end of the housing at a location opposite a front end where the first and second tips are located, the cover being releasably held in a closed position by at least one snap feature positioned along a side of the base between the rear and front ends.

P22. A dental flosser spool, comprising: a base; and a hub mounted to the base;
wherein the dental flosser spool is configured to be releasably mounted to a dental flosser, and the hub is receptive of a length of floss to be wound thereon, the length of floss being used floss collected during use of the dental flosser or unused floss wound on the hub prior to use of the dental flosser.

P23. The dental flosser spool of paragraph P22 wherein the dental flosser spool is configured to be reversibly mounted in the dental flosser in a first orientation when used floss is wound on the hub, and a second orientation when the unused floss is wound on the hub.

P24. The dental flosser spool of any one of paragraphs P22-P23 wherein the dental flosser spool is configured to be releasably mounted in the dental flosser in a first position for mounting used floss on the hub, and in a second position when mounted with unused floss on the hub.

P25. The dental flosser spool of any one of paragraphs P22-P24 wherein the base includes at least one slit formed therein, the at least one slit providing a connection point of the used floss or unused floss to the dental flosser spool.

P26. The dental flosser spool of any one of paragraphs P22-P25 wherein the base has a flat disk shape, and the hub has an elongate cylindrical shape.

P27. The dental flosser spool of any one of paragraphs P22-P26 further comprising at least one of a key slot configured to receive a spool mounting key of the dental flosser and a pass-through bore configured to receive a spool mounting member of the dental flosser.

P28. A dental flosser comprising: a handle; a floss support coupled to the handle, the floss support including a first projection having a first tip and a second projection having a second tip; a floss dispensing spool coupled to the handle; a floss collecting spool coupled to the handle; a thumbwheel coupled to the handle, the thumbwheel being configured to rotate the floss collecting spool and cause floss to move from the floss dispensing spool, across the first tip and the second tip, and onto the floss collecting spool; and a spool brake coupled to the handle, the spool brake being configured to move between a first position where the spool brake prevents rotation of the floss dispensing spool and/or the floss collecting spool and a second position where the spool brake allows rotation of the floss dispensing spool and/or the floss collecting spool; wherein the spool brake includes a release arm accessible from an exterior of the dental flosser, the release arm being configured to move the spool brake between the first position and the second position.

P29. The dental flosser of paragraph P28 wherein the thumbwheel is accessible from the exterior of the handle.

P30. The dental flosser of paragraph P29 wherein the thumbwheel is accessible from opposite sides of the exterior of the handle.

P31. The dental flosser of any one of paragraphs P29-P30 wherein the thumbwheel and the release arm extend through a single opening in the handle.

P32. The dental flosser of any one of paragraphs P28-P31 wherein the spool brake includes a brake pad positioned to resist rotation of the floss dispensing spool.

P33. The dental flosser of paragraph P32 comprising a dispensing spindle coupled to the handle, wherein the brake pad is configured to apply a compression force on the dispensing spindle when the spool brake is in the first position.

P34. The dental flosser of any one of paragraphs P28-P33 comprising a dispensing gear coupled to the handle coaxially with the floss dispensing spool and a collecting gear coupled to the handle coaxially with the floss collecting spool, wherein the spool brake is configured to engage at least one of the dispensing gear or the collecting gear when the spool brake is in the first position.

P35. The dental flosser of paragraph P34 wherein the spool brake is configured to engage both the dispensing gear and the collecting gear when the spool brake is in the first position.

P36. The dental flosser of any one of paragraphs P34-P35 wherein the dispensing gear includes gear teeth that are a different size than gear teeth of the collecting gear.

P37. The dental flosser of any one of paragraphs P34-P36 wherein the collecting gear has a larger diameter than the dispensing gear.

P38. The dental flosser of any one of paragraphs P34-P37 wherein the thumbwheel includes the collecting gear.

P39. A dental flosser comprising: a handle; a floss support coupled to the handle, the floss support including a first projection having a first tip and a second projection having a second tip; a floss dispensing spindle rotatably coupled to the handle; a floss collecting spindle rotatably coupled to the handle; a thumbwheel coupled to the floss collecting spindle, the thumbwheel being configured to rotate the floss collecting spindle and cause floss to move from the floss dispensing spindle, across the first tip and the second tip, and to the floss collecting spindle; and a spool brake coupled to the handle, the spool brake being configured to move between a first position where the spool brake prevents rotation of the floss dispensing spindle and/or the floss collecting spindle and a second position where the spool brake allows rotation of the floss dispensing spindle and/or the floss collecting spindle; wherein the spool brake includes a release arm accessible from an exterior of the dental flosser, the release arm being configured to move the spool brake between the first position and the second position.

P40. The dental flosser of paragraph P39 comprising a dispensing gear positioned coaxially with the floss dispensing spindle.

P41. The dental flosser of paragraph P40 wherein the dispensing gear is an integral part of the floss dispensing spindle.

P42. The dental flosser of any one of paragraphs P39-P41 comprising a collecting gear positioned coaxially with the floss collecting spindle, the thumbwheel being coupled to the collecting gear.

P43. The dental flosser of paragraph P42 wherein the collecting gear is an integral part of the floss collecting spindle.

P44. The dental flosser of any one of paragraphs P39-P43 wherein the thumbwheel and the release arm extend through a single opening in the handle.

P45. The dental flosser of any one of paragraphs P39-P44 wherein the spool brake includes a brake pad positioned to contact and resist rotation of the floss dispensing spindle.

P46. The dental flosser of paragraph P45 wherein the brake pad is configured to apply a compression force to the floss dispensing spindle when the spool brake is in the first position.

P47. A dental flosser, comprising: a handle; a floss support coupled to the handle, the floss support including a first projection having a first tip and a second projection having a second tip; a floss dispensing spindle coupled to the handle; a floss collecting spindle coupled to the handle; a thumbwheel coupled to the handle, the thumbwheel being configured to rotate the floss collecting spindle and cause floss to move from the floss dispensing spindle, across the first tip and the second tip, and onto the floss collecting spindle; and a spool brake coupled to the handle, the spool brake being configured to lock rotation of the floss dispensing spindle and the floss collecting spindle and automatically release rotation of the floss dispensing spindle upon rotation of the thumbwheel; wherein the spool brake includes a brake pad positioned to resist rotation of the floss dispensing spindle by applying a compression force to the floss dispensing spindle.

P48. A dental flosser, comprising: a handle; a floss support coupled to the handle, the floss support including a first projection having a first tip and a second projection having a second tip; a floss dispensing spindle coupled to the handle; a floss collecting spindle coupled to the handle; a thumbwheel coupled to the handle, the thumbwheel being configured to rotate the floss collecting spindle and cause floss to move from the floss dispensing spindle, across the first tip and the second tip, and onto the floss collecting spindle; and a spool brake coupled to the handle, the spool brake being configured to lock rotation of the floss dispensing spindle and the floss collecting spindle and automatically release rotation of the floss dispensing spindle upon rotation of the thumbwheel; wherein the spool brake includes a brake pad positioned to apply a constant amount of force to resist rotation of the floss dispensing spindle.

P49. A dental flosser, comprising: a handle; a floss support coupled to the handle, the floss support including a first projection having a first tip and a second projection having a second tip; a floss dispensing spindle coupled to the handle; a floss collecting spindle coupled to the handle; a thumbwheel coupled to the handle, the thumbwheel being configured to rotate the floss collecting spindle and cause floss to move from the floss dispensing spindle, across the first tip and the second tip, and onto the floss collecting spindle; and a spool brake coupled to the handle, the spool brake being configured to lock rotation of the floss dispensing spindle and the floss collecting spindle and automatically release rotation of the floss dispensing spindle upon rotation of the thumbwheel; wherein the spool brake includes a brake pad positioned to resist rotation of the floss dispensing spindle; and wherein the spool brake includes at least one tip that engages corresponding teeth to lock rotation of the floss dispensing spindle and the floss collecting spindle.

P50. The dental flosser of paragraph P49 wherein the brake pad is positioned to resist rotation of the floss dispensing spindle without engaging the teeth.

P51. The dental flosser of any one of paragraphs P49-P50 wherein the at least one tip of the spool brake disengages the teeth when the thumbwheel rotates the floss collecting spindle.

P52. The dental flosser of paragraph P51 wherein the spool brake resists rotation of the floss dispensing spindle when the thumbwheel rotates the floss collecting spindle.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of" or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, it is terms such as "processing," "computing," "calculating," "determining," "displaying," or the like, refer to the action and processes of an electronic computing device including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Priority patent documents incorporated by reference:—

U.S. Prov. App. No. 63/364,356, titled "Dental Flosser with Floss Tensioner," filed on 9 May 2022.

U.S. Pat. Pub. No. 2021/0259816 (application Ser. No. 17/184,416), titled "Dental Flosser with Floss Tensioner," filed on 24 Feb. 2021, published on 26 Aug. 2021.

U.S. Prov. App. No. 62/980,561, titled "Dental Flosser with Floss Tensioner," filed on 24 Feb. 2020.

What is claimed is:

1. A dental flosser comprising:
a handle;
a floss support coupled to the handle, the floss support including a first projection having a first tip and a second projection having a second tip, the first tip and the second tip being spaced apart in a fixed relationship;
a floss dispensing spool coupled to the handle;
a floss collecting spool coupled to the handle;
a thumbwheel coupled to the handle, the thumbwheel being configured to rotate the floss collecting spool and cause floss to move from the floss dispensing spool, across the first tip and the second tip, and onto the floss collecting spool; and
a spool brake coupled to the handle, the spool brake being configured to move between a first position where the spool brake prevents rotation of the floss dispensing spool and/or the floss collecting spool and a second position where the spool brake allows rotation of the floss dispensing spool and/or the floss collecting spool;
wherein the spool brake includes a release arm accessible from an exterior of the dental flosser, the release arm being configured to move the spool brake between the first position and the second position; and
wherein the spool brake includes a brake pad structured and positioned to apply a compression force to resist rotation of the floss dispensing spool.

2. The dental flosser of claim 1 wherein the thumbwheel is accessible from the exterior of the handle.

3. The dental flosser of claim 2 wherein the thumbwheel is accessible from opposite sides of the exterior of the handle.

4. The dental flosser of claim 2 wherein the thumbwheel and the release arm extend through a single opening in the handle.

5. The dental flosser of claim 1 comprising a dispensing spindle coupled to the handle, wherein the brake pad is configured to apply the compression force to the dispensing spindle when the spool brake is in the first position.

6. The dental flosser of claim 1 comprising a dispensing gear coupled to the handle coaxially with the floss dispensing spool and a collecting gear coupled to the handle coaxially with the floss collecting spool, wherein the spool brake is configured to engage at least one of the dispensing gear or the collecting gear when the spool brake is in the first position.

7. The dental flosser of claim 6 wherein the spool brake is configured to engage both the dispensing gear and the collecting gear when the spool brake is in the first position.

8. The dental flosser of claim 6 wherein the dispensing gear includes gear teeth that are a different size than gear teeth of the collecting gear.

9. The dental flosser of claim 6 wherein the collecting gear has a larger diameter than the dispensing gear.

10. The dental flosser of claim 6 wherein the thumbwheel includes the collecting gear.

11. A dental flosser comprising:
a handle;
a floss support coupled to the handle, the floss support including a first projection having a first tip and a second projection having a second tip, the first tip and the second tip being spaced apart in a fixed relationship;
a floss dispensing spindle rotatably coupled to the handle;
a floss collecting spindle rotatably coupled to the handle;
a thumbwheel coupled to the floss collecting spindle, the thumbwheel being configured to rotate the floss collecting spindle and cause floss to move from the floss dispensing spindle, across the first tip and the second tip, and to the floss collecting spindle; and
a spool brake coupled to the handle, the spool brake being configured to move between a first position where the spool brake prevents rotation of the floss dispensing spindle and/or the floss collecting spindle and a second position where the spool brake allows rotation of the floss dispensing spindle and/or the floss collecting spindle;
wherein the spool brake includes a release arm accessible from an exterior of the dental flosser, the release arm being configured to move the spool brake between the first position and the second position.

12. The dental flosser of claim 11 comprising a dispensing gear positioned coaxially with the floss dispensing spindle.

13. The dental flosser of claim 12 wherein the dispensing gear is an integral part of the floss dispensing spindle.

14. The dental flosser of claim 11 comprising a collecting gear positioned coaxially with the floss collecting spindle, the thumbwheel being coupled to the collecting gear.

15. The dental flosser of claim 14 wherein the collecting gear is an integral part of the floss collecting spindle.

16. The dental flosser of claim 11 wherein the thumbwheel and the release arm extend through a single opening in the handle.

17. The dental flosser of claim 11 wherein the spool brake includes a brake pad positioned to contact and resist rotation of the floss dispensing spindle.

18. A dental flosser comprising:
a handle;
a floss support coupled to the handle, the floss support including a first projection having a first tip and a second projection having a second tip, the first tip and the second tip being spaced apart in a fixed relationship;
a floss dispensing spool coupled to the handle;
a floss collecting spool coupled to the handle;

a thumbwheel coupled to the handle, the thumbwheel being configured to rotate the floss collecting spool and cause floss to move from the floss dispensing spool, across the first tip and the second tip, and onto the floss collecting spool; and a spool brake coupled to the handle, the spool brake being configured to move between a first position where the spool brake prevents rotation of the floss dispensing spool and/or the floss collecting spool and a second position where the spool brake allows rotation of the floss dispensing spool and/or the floss collecting spool;

wherein the spool brake includes a release arm accessible from an exterior of the dental flosser, the release arm being configured to move the spool brake between the first position and the second position; and wherein the thumbwheel and the release arm extend through a single opening in the handle.

19. The dental flosser of claim 18 wherein the thumbwheel is accessible through separate slots positioned on opposite sides of the handle.

20. A dental flosser comprising:

a handle;

a floss support coupled to the handle, the floss support including a first projection having a first tip and a second projection having a second tip, the first tip and the second tip being spaced apart in a fixed relationship;

a floss dispensing spool coupled to the handle;

a dispensing gear coupled to the handle coaxially with the floss dispensing spool;

a floss collecting spool coupled to the handle;

a collecting gear coupled to the handle coaxially with the floss collecting spool;

a thumbwheel coupled to the handle, the thumbwheel being configured to rotate the floss collecting spool and cause floss to move from the floss dispensing spool, across the first tip and the second tip, and onto the floss collecting spool; and a spool brake coupled to the handle, the spool brake being configured to move between a first position where the spool brake prevents rotation of the floss dispensing spool and/or the floss collecting spool and a second position where the spool brake allows rotation of the floss dispensing spool and/or the floss collecting spool;

wherein the spool brake includes a release arm accessible from an exterior of the dental flosser, the release arm being configured to move the spool brake between the first position and the second position; and wherein the spool brake is a single component configured to engage both the dispensing gear and the collecting gear when the spool brake is in the first position.

21. The dental flosser of claim 20 wherein the dispensing gear includes gear teeth that are a different size than gear teeth of the collecting gear.

22. The dental flosser of claim 20 wherein the collecting gear has a larger diameter than the dispensing gear.

23. A dental flosser comprising:

a handle;

a floss support coupled to the handle, the floss support including a first projection having a first tip and a second projection having a second tip, the first tip and the second tip being spaced apart in a fixed relationship;

a floss dispensing spindle rotatably coupled to the handle;

a floss collecting spindle rotatably coupled to the handle;

a thumbwheel coupled to the floss collecting spindle, the thumbwheel being configured to rotate the floss collecting spindle and cause floss to move from the floss dispensing spindle, across the first tip and the second tip, and to the floss collecting spindle; and a spool brake coupled to the handle, the spool brake being configured to move between a first position where the spool brake prevents rotation of the floss dispensing spindle and/or the floss collecting spindle and a second position where the spool brake allows rotation of the floss dispensing spindle and/or the floss collecting spindle;

wherein the spool brake includes a release arm accessible from an exterior of the dental flosser, the release arm being configured to move the spool brake between the first position and the second position;

wherein the spool brake includes a brake pad positioned to contact and resist rotation of the floss dispensing spindle; and wherein the brake pad is configured to apply a compression force to the floss dispensing spindle when the spool brake is in the first position.

* * * * *